United States Patent [19]

Kawagoe et al.

[11] Patent Number: 4,827,416
[45] Date of Patent: May 2, 1989

[54] METHOD AND SYSTEM FOR CONTROLLING AUTOMOTIVE SUSPENSION SYSTEM, PARTICULARLY FOR CONTROLLING SUSPENSION CHARACTERISTICS IN ACCORDANCE WITH ROAD SURFACE CONDITIONS

[75] Inventors: Kenji Kawagoe; Satoru Ishihara, both of Yokosuka; Hideo Ito, Zushi; Masatsugu Yokote, Yokohama; Kazunobu Kawabata, Yokosuka, all of Japan

[73] Assignee: Nissan Motor Company, Limited, Kanagawa, Japan

[21] Appl. No.: 906,239

[22] Filed: Sep. 12, 1986

[30] Foreign Application Priority Data

Sep. 13, 1985 [JP] Japan .................. 60-202692

[51] Int. Cl.$^4$ .................................................. B60G 17/00
[52] U.S. Cl. .................... 364/424.05; 280/707
[58] Field of Search ............. 364/424; 280/707, 6 R, 280/6 H, 6.11; 180/169, 167

[56] References Cited

U.S. PATENT DOCUMENTS

| | | | |
|---|---|---|---|
| 2,247,749 | 7/1941 | de Venel | 280/707 |
| 3,003,783 | 10/1961 | Brueder | 280/707 |
| 3,029,089 | 4/1962 | Nashman | 280/707 |
| 3,321,210 | 5/1967 | Delchev | 280/6 R |
| 3,603,612 | 9/1971 | Stafford et al. | 380/707 |
| 3,608,925 | 9/1971 | Murphy | 280/112 A |
| 3,677,561 | 7/1972 | McNally | 280/124 F |

(List continued on next page.)

FOREIGN PATENT DOCUMENTS

| | | |
|---|---|---|
| 0027869 | 5/1981 | European Pat. Off. . |
| 0080291 | 6/1983 | European Pat. Off. . |
| 0091017 | 10/1983 | European Pat. Off. . |
| 56-31861 | 3/1981 | Japan . |
| 2006131 | 5/1979 | United Kingdom . |
| 2084692 | 4/1982 | United Kingdom . |
| 2119473 | 11/1983 | United Kingdom . |

OTHER PUBLICATIONS

Eric Rickman, Circle Track, "A Guide to Dirk Track Suspension", pp 78-87.
A. G. Thompson et al., SAE Technical Paper Series #800520, "An Optimal Linear Active Suspension with Finite Road Preview", 1980.
SAE #680750, "Some Fundamental Limitations of Active and Passive Vechicle Suspension Systems", Erich K. Bender, Oct. 1968.

Primary Examiner—Parshotam S. Lall
Assistant Examiner—Thomas G. Black
Attorney, Agent, or Firm—Foley & Lardner, Schwartz, Jeffery, Schwaab, Mack, Blumenthal & Evans

[57] ABSTRACT

A suspension control system employs a road sensor monitoring road roughness or smoothness and producing a road condition indicative signal. The control system also employs other sensor or sensors for monitoring at least one preselected suspension control parameter, such as vehicle speed, steering angular variation and so forth, other than road roughness. The suspension switches between relatively hard and relatively soft characteristics based on the preselected suspension control prameters. In order to make suspension control more precisely suited to the vehicle driving conditions, the control characaterisitcs of the suspension system are adjusted depending upon the road condition. With this arrangement, even when the suspension is controlled so as to suppress vehicular roll based on the steering angular displacement and when rough road conditions cause steering angular displacement due to kick-back from the road input through the steering mechanism, the erroneous judgement that steering adjustments are about to cause vehicular roll can be avoided. In case of acceleration responsive suspension control, rough road conditions tend to cause a driver to unconsciously operate the accelerator pedal so as to increase and decrease throttle valve angular position relative to the fully closed position. According to the present invention, by adjusting the control characteristics, erroneous detection that the vehicle is accelerating, which would normally cause winding-up, can be successfully avoided.

38 Claims, 12 Drawing Sheets

U.S. PATENT DOCUMENTS

| | | | |
|---|---|---|---|
| 3,827,538 | 8/1974 | Morgan | 188/319 |
| 3,850,027 | 11/1974 | Nakanishi et al. | 73/600 |
| 3,873,123 | 3/1975 | Joneleit | 280/124 F |
| 3,902,691 | 9/1975 | Ott | 246/167 R |
| 3,920,283 | 11/1975 | Strader | 280/6 R |
| 3,945,644 | 3/1976 | Hiruma | 280/703 |
| 3,992,039 | 11/1976 | Hiruma | 280/707 |
| 3,995,883 | 12/1976 | Glaze | 280/707 |
| 4,017,099 | 4/1977 | Hegel et al. | 280/707 |
| 4,054,295 | 10/1977 | Elliott | 280/6.1 |
| 4,065,154 | 12/1977 | Glaze | 280/707 |
| 4,084,667 | 4/1978 | Kurrat | 188/275 |
| 4,100,795 | 7/1978 | Panetti | 73/146 |
| 4,105,216 | 8/1978 | Graham et al. | 280/6 R |
| 4,145,073 | 3/1979 | McLuckie et al. | 280/702 |
| 4,152,000 | 5/1979 | Meisel, Jr. | 280/6 H |
| 4,162,083 | 7/1979 | Zabler et al. | 280/703 |
| 4,164,664 | 8/1979 | Kasiewicz | 280/707 X |
| 4,185,845 | 1/1980 | Misch et al. | 280/6 H |
| 4,266,790 | 5/1981 | Uemura et al. | 280/6.1 |
| 4,310,172 | 1/1982 | Claude et al. | 280/703 |
| 4,313,529 | 2/1982 | Kato et al. | 188/299 |
| 4,323,266 | 4/1982 | Savage | 280/707 |
| 4,327,936 | 5/1982 | Sekiguchi | 280/711 |
| 4,333,668 | 6/1982 | Hendrickson et al. | 280/707 |
| 4,349,077 | 9/1982 | Sekiguchi et al. | 180/41 |
| 4,363,092 | 12/1982 | Abo et al. | 364/200 |
| 4,377,293 | 3/1983 | Senoo | 280/6 R |
| 4,382,603 | 5/1983 | Senoo | 280/6 R |
| 4,390,187 | 6/1983 | Maeda | 280/6 R |
| 4,401,310 | 8/1983 | Ishikawa et al. | 280/6.1 |
| 4,402,375 | 9/1983 | Glaze | 180/169 |
| 4,433,386 | 2/1984 | Este | 364/563 |
| 4,436,318 | 3/1984 | Ichikawa et al. | 280/104 |
| 4,462,610 | 7/1984 | Saito et al. | 280/707 |
| 4,463,839 | 8/1984 | Ashiba | 188/299 |
| 4,466,625 | 8/1984 | Kondo et al. | 280/6 R |
| 4,468,739 | 8/1984 | Woods et al. | 364/424 |
| 4,473,319 | 9/1984 | Spangler | 404/72 |
| 4,483,409 | 11/1984 | Fun | 180/89.15 |
| 4,506,751 | 3/1985 | Stephens | 180/89.15 |
| 4,506,909 | 3/1985 | Nakashima et al. | 280/707 |
| 4,526,401 | 7/1985 | Kakizaki et al. | 280/707 |
| 4,527,676 | 7/1985 | Emura et al. | 188/299 |
| 4,537,275 | 8/1985 | Kimura et al. | 180/300 |
| 4,537,411 | 8/1985 | Naramoto | 280/6 R |
| 4,540,188 | 9/1985 | Meloche et al. | 280/6 R |
| 4,555,126 | 11/1985 | Ishimitsu et al. | 280/707 |
| 4,572,317 | 2/1986 | Isono et al. | 280/227 |
| 4,579,366 | 4/1986 | Doi et al. | 280/707 |
| 4,586,728 | 5/1986 | Tokunaga et al. | 280/707 |
| 4,595,072 | 6/1986 | Barnea | 180/169 |
| 4,600,215 | 7/1986 | Kuroki et al. | 280/707 |
| 4,616,163 | 10/1986 | Kanai et al. | 318/611 |
| 4,616,848 | 10/1986 | Sugasawa et al. | 280/707 |
| 4,621,832 | 11/1986 | Nakashima et al. | 280/707 |
| 4,624,477 | 11/1986 | Kumagai et al. | 280/707 |
| 4,647,069 | 3/1987 | Iijima | 280/707 |
| 4,651,290 | 3/1987 | Masaki et al. | 364/550 |
| 4,657,280 | 4/1987 | Ohmori | 280/707 |
| 4,659,104 | 4/1987 | Tanaka et al. | 280/707 |
| 4,669,749 | 6/1987 | Tanaka et al. | 280/707 |
| 4,696,489 | 9/1987 | Fujishiro et al. | 280/707 |
| 4,718,695 | 1/1988 | Kawagoe | 280/707 |

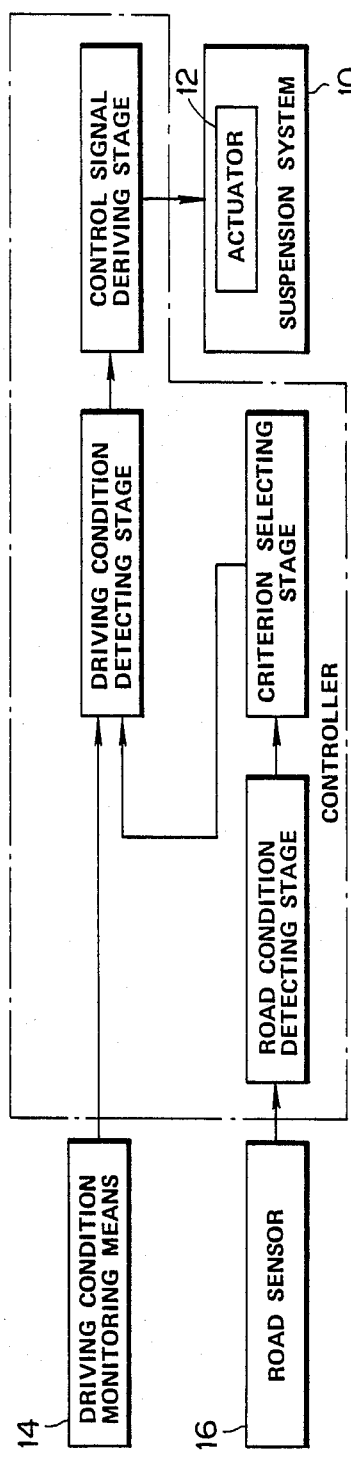
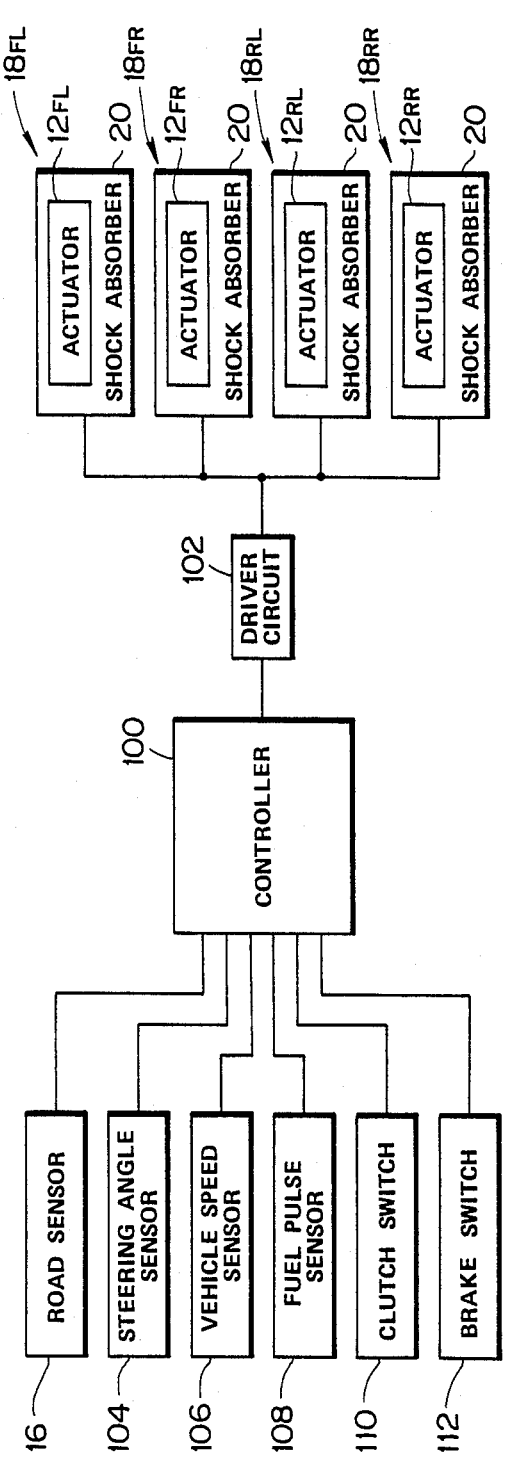

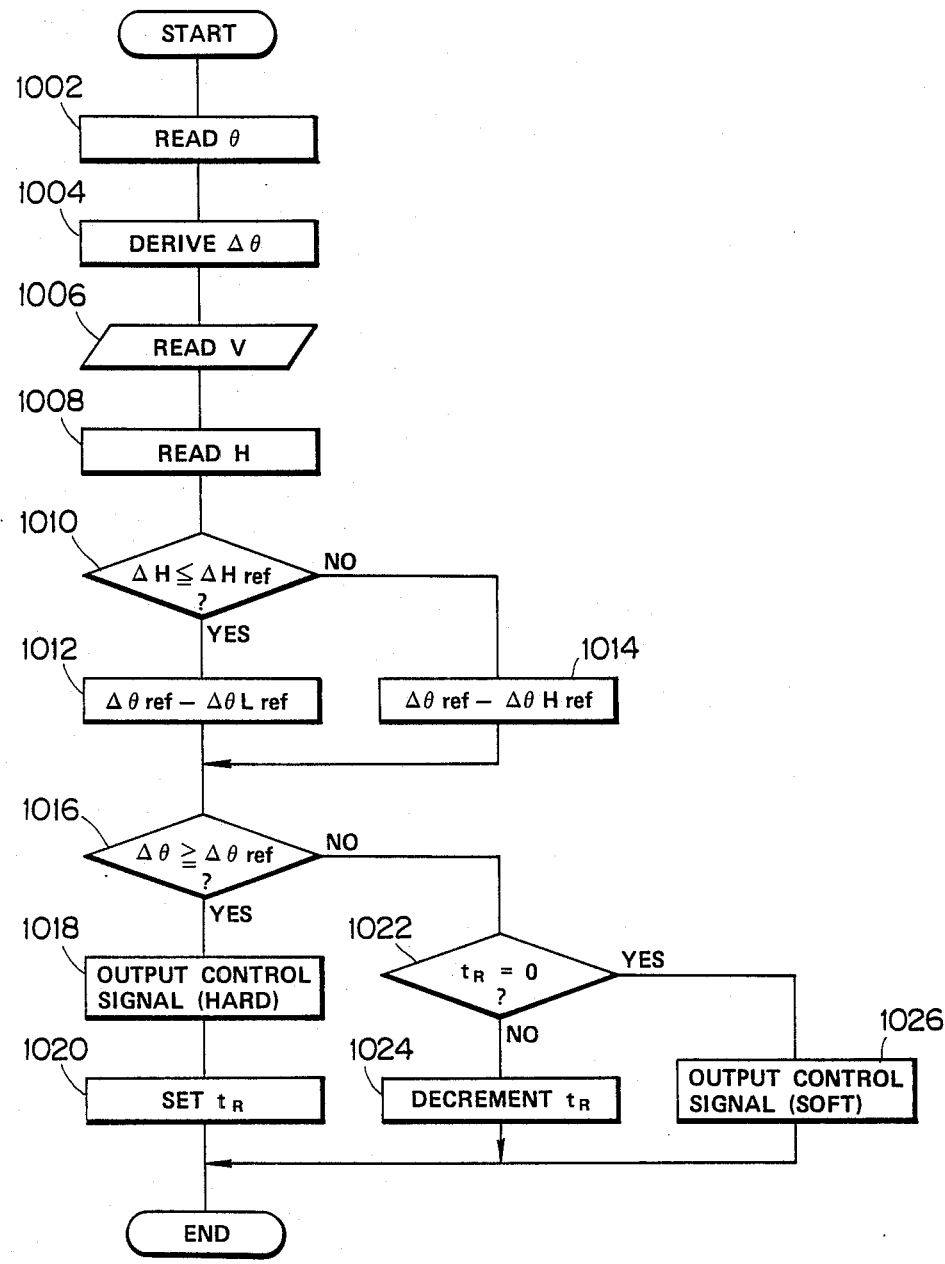

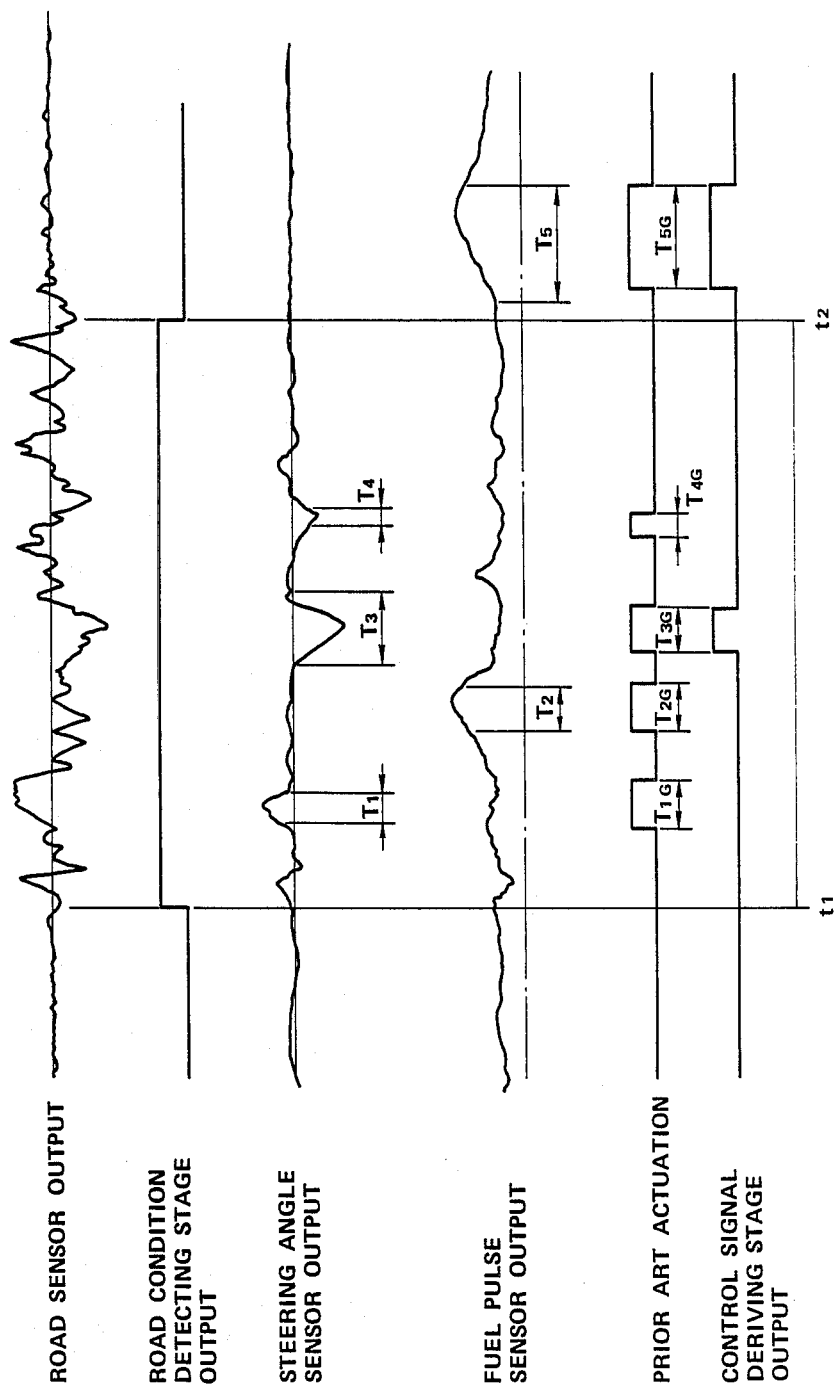

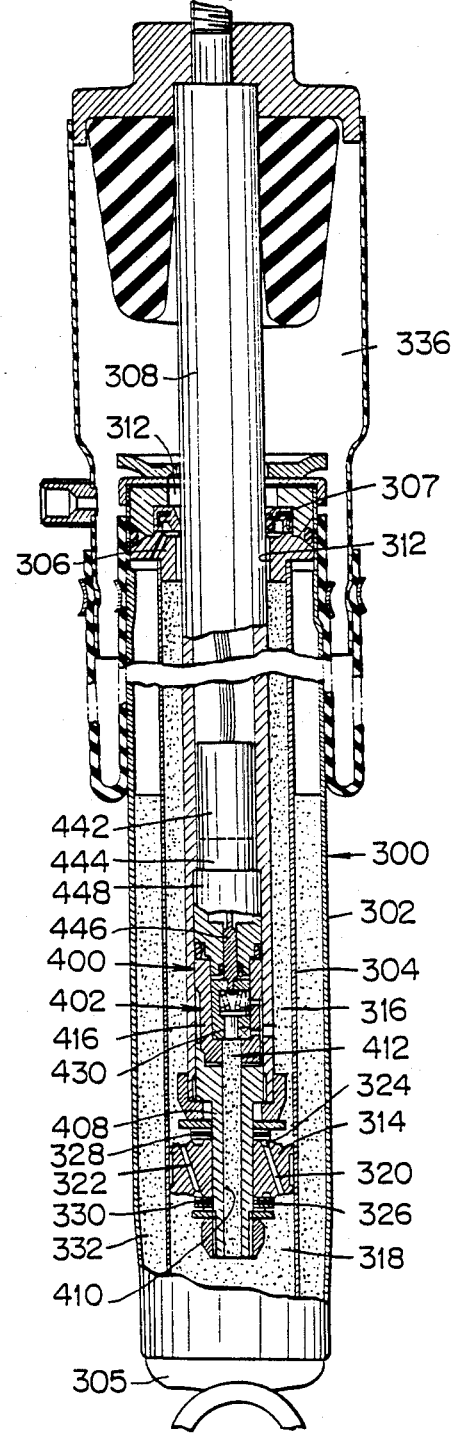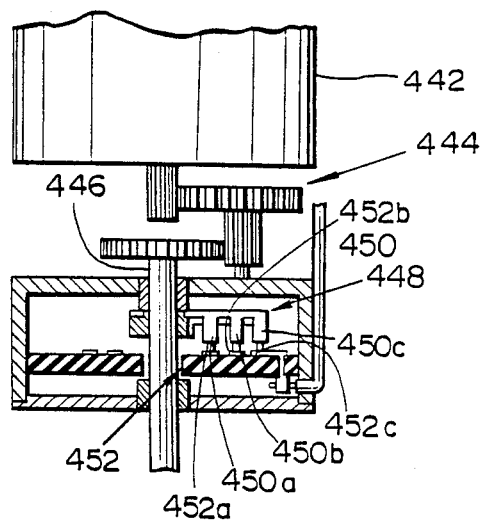
FIG.9
FIG.10

METHOD AND SYSTEM FOR CONTROLLING AUTOMOTIVE SUSPENSION SYSTEM, PARTICULARLY FOR CONTROLLING SUSPENSION CHARACTERISTICS IN ACCORDANCE WITH ROAD SURFACE CONDITIONS

BACKGROUND OF THE INVENTION

1. Field of the Invention

The present invention relates generally to a method and system for controlling an automotive suspension system so as to achieve both riding comfort and vehicle driving stability. More specifically, the invention relates to a method and system for controlling the automotive suspension system depending upon various suspension control parameters, such as roll intensity, pitch intensity and so forth, with variable control characteristics. In more detail, the invention relates to a suspension control for controlling the automotive suspension system with control characteristics that vary with road surface conditions.

2. Description of the Prior Art

Recently, suspension control systems controlling the performance of vehicular suspension systems have been used to provide better riding comfort and better vehicle driving ability. Such suspension control systems control the damping characteristics or shock absorbing characteristics of the vehicular suspension system depending upon various vehicle driving parameters affecting riding comfort and drivability of the vehicle. For example, suspension control systems may adjust suspension characteristics depending upon road condition, vehicle speed, acceleration and deceleration of the vehicle, vehicular roll and so forth. In order to obtain desired suspension control characteristics. the suspension control system receives preselected vehicle driving parameters, compares a value representative of the preselected vehicle driving parameters with a Corresponding reference value and adjusts suspension characteristics accordingly.

For example, the co-pending U.S. patent application Ser. No. 678,806, now U.S. Pat. No. 4,652,010, filed on Dec. 6. 1984, the corresponding European Patent Application of which has been published as First Publication No. 01 45 013, discloses a vehicular roll suppressive suspension control system, which invention has been assigned to the assignee of the present invention. In the disclosed system, the stiffness of a vehicular suspension system is selected in accordance with vehicle speed and the rate of steering adjustment, which influence the centrifugal force on a turning vehicle. Shock absorbers in the suspension system can operate in either high or low damping force modes. Vehicle speed and steering wheel position are monitored, and the latter property is checked periodically to derive a measure of steering wheel acceleration. When steering wheel acceleration, i.e. the second derivative of the steering angle with respect to time, exceeds a threshold value, then shock absorbers are operated in the high damping force mode otherwise, they operate in the low damping force mode. The threshold value to which the steering wheel acceleration value is compared is derived as a function of vehicle speed.

On the other hand, the co-pending U.S. patent application Ser. No. 649,484 now abandoned, filed on Sept. 11, 1984, the corresponding European Patent Application of which has been published as First Publication No. 01 35 902, discloses a nose-dive suppressive suspension control system, which invention is also assigned to the assignee of the present invention. In the disclosed system, an automotive vehicle suspension has a damper with variable damping characteristics, specifically adjustable damping force. A controller responds to application and release of vehicle brakes by increasing the damping force. Increasing the damping force at the beginning of braking suppresses nose-dive of the vehicle. On the other hand, increasing the damping force at the end of braking suppresses pitching motion of the vehicle. This greatly improves the behavior of the vehicle sprung mass during braking. A similar nose dive suppressive suspension control system active in response to braking of the vehicle has been disclosed in the Japanese Patent First Publication (Tokkai) Showa 60-148710, published on Aug. 6, 1985. Furthermore, the co-pending U.S. patent application Ser. No. 744,380, now U.S. Pat. No. 4,733,883, filed on June 13, 1985, which has been assigned to the assignee of the present invention, discloses a suspension control system which can precisely control the damping characteristics of vehicular suspension in order to successfully and satisfactorily prevent dive and rebound. The suspension control system is designed to detect vehicle deceleration on the basis of variations in vehicle speed and to compare the vehicle speed with a predetermined vehicle speed criterion across which damping characteristics of the vehicular suspension varies between harder suspension mode and softer suspension mode. The vehicle speed criterion varies with vehicle deceleration so that the criterion becomes higher when deceleration is greater than a predetermined level. By hardening the suspension earlier during relatively abrupt deceleration of the vehicle, the intensity of nose dive is reduced and thus the intensity of rebounding motion after nose-dive can be reduced. This ensures riding comfort by reducing the intensity of pitching behavior of the vehicle front end. On the other hand, by delaying the hardening of the suspension during gentle deceleration of the vehicle, softer damping characteristics can be maintained for a longer period to ensure riding comfort by successfully absorbing bounding and rebounding shocks from the road surface.

A similar acceleration and deceleration dependent suspension control system has been disclosed in the Japanese Patent First Publication (Tokkai) Showa 60-154906, published on Aug. 14, 1985. Vehiclular acceleration and deceleration are detected based on fuel supply control pulse width or fuel injection pulse width which is taken as engine speed indicative parameter and vehicle speed.

The co-pending U.S. patent application Ser. No. 744,379 now abandoned, filed on June 13, 1985, corresponding European Patent Application of which has been published as the First publication No. 01 67 159, discloses a suspension control system which is variable of damping characteristics of the suspension depending upon road surface condition and which has been assigned to the common assignee to the present invention. In the disclosure, the suspension control system includes a road surface sensor which produces a road condition indicative signal. A controller detects bounding and rebounding motions of the vehicle suspension on the basis of the road condition indicative signal from the road sensor. The controller monitors when the bounding and rebounding motion exceeds a predetermined level and when its frequency falls within a given frequency range. These conditions reflect typical vehicle body behavior during travel along an undulating road, in which case, the controller produces a control signal to stiffen the suspension system. This suppresses pitching motion of the vehicle on undulating road so as to satisfactorily and successfully provide good riding comfort.

Furthermore. the assignee of the present invention also assigned the U.S. Pat. No. 4,600,215, issued on July 15, 1986. The invention disclosed in this U.S. Patent adjusts suspension control characteristics relative to road surface condition depending upon vehicle speed. For instance, a suspension control system for automotive vehicles automatically adjusts the damping strength of variable shock absorbers or other dampers in accordance with road surface conditions. The sensor signal reflects vertical displacement of the vehicle body from the road surface. The sensor signal is compared to a corresponding reference level which is variable depending upon a vehicle speed. The results of comparison give an indication of the degree and scale of irregularities in the road surface. The comparison information is sent to a suspension system controller which causes actuation of the shock or other dampers absorbers to a stiffer mode of operation when road surface roughness requiring harder suspension is recognized.

In addition the co-pending U.S. patent application Ser. No. 791,766, now U.S. Pat. No. 4,616,848, filed on Sept. 3, 1985, discloses a suspension control system includes a suspension system variable of stiffness and/or damping characteristics, a road sensor producing a road condition indicative signal and a controller for controlling the stiffness and/or damping characteristics of the suspension system depending upon the road condition indicative signal value and the vehicle speed indicative signal value. The controller is detective of the vehicle speed in a predetermined normal speed range which is defined by a lower speed criteria and an upper speed criteria, for generally maintaining the stiffness or damping characteristics of the suspension in relatively soft. The controller is detective of the vehicle speed indicative signal value smaller than the foregoing lower speed criteria to increase sensitivity of the road sensor and/or harden the suspension system at harder level than that in the normal speed range when the roughness of the road surface beyond a rough road criteria. Also, the controller is detective of the vehicle speed indicative signal value greater than the upper speed criteria for increasing sensitivity of the road sensor and/or harden the suspension system at harder level than that in the normal speed range when the roughness of the road surface beyond a rough road criteria, the relative displacement between a vehicle body and a road wheel, a vehicle speed sensor producing a vehicle speed indicative signal.

SUMMARY OF THE INVENTION

In view of the aforementioned prior proposals, the present invention is intended to provide more a advanced suspension control system and control method, which may derive more precise suspension control parameters for controlling the vehicular suspension in precise accordance with vehicle driving conditions.

Therefore, it is a principle object of the present invention to provide a method and system for controlling a vehicular suspension with variable suspension control characteristics.

Another object of the invention to provide a method and system for controlling a vehicle suspension system in relation to a preselected suspension control parameter which is compared with a given threshold value which varies with other parameters.

A more precise object of the present invention is to provide a method and system for controlling a vehicle suspension system in relation to a preselected suspension control parameter which is compared with a given threshold value which varies with road surface conditions.

In order to accomplish the aforementioned and other objects, a suspension control system, according to the present invention employs a road sensor monitoring road roughness or smoothness and producing a road condition indicative signal. The control system also employs other sensor or sensors for monitoring at least one preselected suspension control parameter, such as vehicle speed, steering angular variation and so forth, other than road roughness. The suspension switches between relatively hard and relatively soft characteristics based on the preselected suspension control parameters. In order to make suspension control more precisely suited to the vehicle driving conditions, the control characteristics of the suspension system are adjusted depending upon the road condition.

With this arrangement, even when the suspension is controlled so as to suppress vehicular roll based on the steering angular displacement and when rough road conditions cause steering angular displacement due to kick-back from the road input through the steering mechanism, the erroneous judgment that steering adjustments are about to cause vehicular roll can be avoided. In case of acceleration responsive suspension control, rough road conditions tend to cause a driver to unconsciously operate the accelerator pedal so as to increase and decrease throttle valve angular position relative to the fully closed position. According to the present invention, by adjusting the control characteristics, erroneous detection that the vehicle is accelerating, which would normally cause or winding-up, can be successfully avoided.

Therefore, as will be appreciated herefrom, by adjusting the control characteristics depending upon the road surface conditions. erroneous detection of suspension control criteria requiring harder suspension characteristics can be satisfactorily and successfully avoided.

According to one aspect of the invention. an automotive suspension control system comprises a suspension system suspending road wheels from a vehicle body and having suspension characteristics variable between first harder suspension characteristics and second softer suspension characteristics, an actuator associated with the suspension system for operating the suspension system in a selected one of the first harder suspension characteristics and the second softer suspension characteristics, a first sensor monitoring a preselected first suspension control parameter indicative of vehicle driving behavior and producing a first sensor signal, a second sensor monitoring roughness of the road surface and producing a second sensor signal indicative of the road surface condition, and a controller deriving a control signal for operating the actuator to operate the suspension system in the selected on of the first harder suspension characteristics and the second softer suspension characteristics depending on the first sensor signal value and predetermined control characteristics, the controller having a plurality of the predetermined control characteristics and selecting one of the control characteristics according to the value of the second sensor signal.

The controller compares the first sensor signal value with a given threshold value and produces a control signal ordering the actuator to operate the suspension system in the first harder suspension characteristics when the first sensor signal value is greater than the threshold value. The threshold value is variable between first and second threshold values depending upon the second sensor signal value. The first threshold value is less than the second threshold value, and the controller selects the second threshold value when the second sensor signal value exceeds a predetermined reference value which represents a smooth/rough road condition criterion.

In the preferred embodiment. the first sensor monitors vehicle driving behavior leading to vehicular roll and produces a first sensor signal having a value representative of vehicular roll intensity. Practically, the first sensor comprises a steering angle sensor producing a first sensor signal representative of steering column angular displacement.

In the alternative, the first sensor monitors vehicle driving behavior leading to vehicular pitch and produces a first sensor signal having a value representative of vehicular pitch intensity. The first sensor monitors a parameter influencing engine revolution speed and produce an engine speed indicative first sensor signal. The first sensor monitors a fuel supply pulse having a pulse width representative of the load on the engine. and the controller detects engine acceleration and deceleration based on variations in the fuel supply pulse width. The automotive suspension control system may further comprises means for detecting power transmission gear position, and the controller adjusts the threshold value according to the transmission gear position.

According to another aspect of the invention, an automotive suspension control system comprises a suspension system suspending road wheels from a vehicle body and having suspension characteristics variable between a first harder suspension characteristics and a second softer suspension characteristics, an actuator associated with the suspension system for operating the suspension system in a selected one of the first harder suspension characteristics and the second softer suspension characteristics, a first sensor means for monitoring a vehicle driving operation leading to changes in vehicular profile and producing a first sensor signal having a value representative of the extent of vehicular profile change, a second sensor means for monitoring the roughness of the road surface and producing a second sensor signal indicative of the road surface condition, and a controller deriving a control signal ordering the actuator to operate the suspension system in the selected one of the first and second suspension characteristics depending on the first sensor signal value and predetermined control characteristics, in such a manner that the suspension system normally operates in the second softer suspension characteristics and operates in the first harder suspension characteristics in response to vehicular profile changes exceeds a predetermined extent. the controller selecting one of a plurality of control characteristics according to the value of the second sensor signal.

The second sensor comprises a potentiometer monitoring relative displacement between the vehicle body and the road wheel and producing the second sensor signal indicative of the displacement between the vehicle body and the road wheel. Alternatively, the second sensor comprises an ultra-sonic sensor mounted on the vehicle body which transmits ultra-sonic waves toward the road surface, receives the ultra-sonic waves reflected by the road surface and determines the distance to the road surface by measuring the elapsed time between transmission of the ultra-sonic waves and reception of the reflected ultra-sonic waves.

In the preferred embodiment, the suspension system includes a variable damping force shock absorber with variable damping characteristics capable of producing a greater damping force in said first harder suspension characteristics of said suspension system and a smaller damping force in said second softer suspension characteristics of said suspension system.

BRIEF DESCRIPTION OF THE DRAWINGS

In the drawings:

FIG. 1 is a schematic block diagram of the general concept of a suspension control system according to the present invention;

FIG. 2 is a block diagram of the preferred embodiment of the suspension control system according to the invention;

FIG. 6 is a flowchart of a roll-suppressive suspension control program executed by the controller of FIG. 5;

FIG. 8 is a timing chart for aid in demonstrating the practical suspension control operations performed by the preferred embodiment of the suspension control system of FIG. 2;

FIG. 9 is a section through a three-way adjustable variable damping force shock absorber, which can serve as a replacement for the two-way variable damping force shock absorber employed in the preferred embodiment of the suspension control system of FIG. 2;

FIG. 10 is a section through the driving arrangement for the three-way adjustable shock absorber of FIG. 9;

DESCRIPTION OF THE PREFERRED EMBODIMENT

Figure 3:
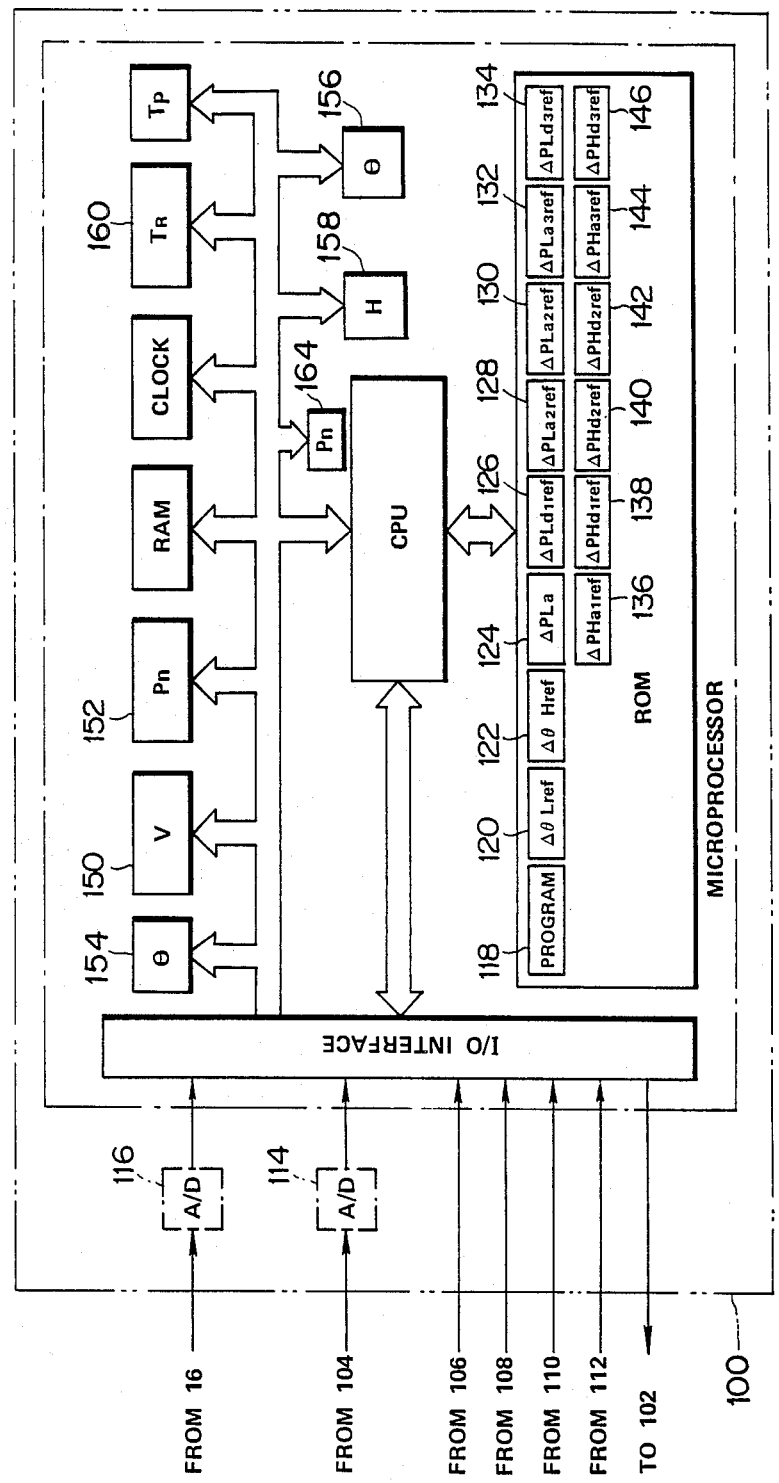
FIG. 3 is a block diagram of a controller comprising a microprocessor employed in the suspension control system of FIG. 2.

Referring now to the drawings, particularly to FIG. 1, the preferred embodiment of a suspension control system, according to the present invention, is designed to adjust the suspension characteristics of a suspension system 10. It should be noted that, the wording "suspension characteristics" used through out the disclosure and the appended claims represents damping characteristics of a damper, such as a hydraulic shock absorber, pneumatic shock absorber and so forth, roll-stabilizing characteristics of a roll-stabilizer, the spring characteristics of suspension spring, such as a pneumatic spring and so forth. Therefore, the wording "adjustment of suspension characteristics" represents adjustment or variation of any one of the damping characteristics, roll-stabilizing characteristics and spring characteristics. Furthermore, the wordings "HARD suspension characteristics" and "SOFT suspension characteristics" represent the condition of suspension ad detailed below:

the damper is set in "HARD damping characteristics mode" to produce a greater damping force than in "SOFT damping characteristics mode" to which the damper is set under conditions where the SOFT suspension characteristics are ordered;

the roll-stabilizer is set in "HARD stabilizer characteristics mode" to produce a greater torsional modulus than in "SOFT stabilizer characteristics mode" to which the roll-stabilizer is set under conditions where the SOFT suspension characteristics are ordered; and/or the suspension spring is set in "HARD spring characteristics mode" to produce a greater spring force than in "SOFT spring characteristics mode" to which the suspension spring is set under conditions where the SOFT suspension characteristics are ordered.

It should be further noted that the suspension characteristics can be adjusting one of the damping characteristics, roll-stabilizing characteristics and the spring characteristics or adjusting two or more of them in combination.

The suspension system 10 thus includes an actuator 12 for adjusting the suspension characteristics. The actuator 12 is connected to a controller 100 which monitors vehicle driving conditions and derives a control signal to be sent to the actuator 12. In order to monitor the vehicle driving condition, the controller 100 is connected to a driving condition monitoring means 14 which monitors a preselected suspension control parameter, such as steering angular displacement, engine acceleration and deceleration and so forth. The controller 100 receives a driving condition indicative signal from the driving condition monitoring means 14, which driving condition indicative signal has a value representative of the monitored vehicle driving condition. Also, the controller 100 is connected to a road sensor 16 which monitors road surface condition and produces a road condition indicative signal.

The controller 100 generally derives the control signal to operate the actuator 12 for adjusting the suspension characteristics based on the driving condition indicative signal, according to given suspension control characteristics. The wording "suspension control characteristics" or "control characteristics" represents a schedule of adjustment of the suspension characteristics, HARD/SOFT suspension characteristics criteria to be compared with the driving condition indicative signal value and others.

The controller 100 is provided with a plurality of control characteristics to be selectively used to derive the control signal. Selection of the control characteristics is performed on the basis of the road condition indicative signal value which represents the road surface condition.

In the shown embodiment, the controller 100 adjusts a single, selected control characteristic, in this case, the HARD/SOFT suspension characteristics criterion. Therefore, the controller 100 is provided with a road condition detecting stage. In practice, the road condition detecting stage distinguishes between smooth road conditions and rough road conditions. The controller also has a criterion selection stage following the road condition detecting stage for selecting one of two criteria, one of which is to be selected when smooth road conditions are detected and the other is to be selected when the rough road conditions are detected.

The controller 100 also has a driving condition detecting stage. The driving condition detecting stage receives the criterion selected by the criterion selecting stage. The driving condition detecting stage compares the driving condition indicative signal value from the driving condition monitoring means with the input criterion value. A control signal deriving stage in the controller 100 then derives the control signal based on the output of the driving condition detecting stage. In practice, when the driving condition indicative value is greater than the criterion value, a control signal ordering HARD suspension characteristics is derived by the control signal deriving stage. On the other hand, when the driving condition indicative signal value is equal to or smaller than the criterion value, a control signal ordering SOFT suspension characteristics is derived.

The control signal is then output to the actuator 12 to order the suspension system to the selected one of the HARD and SOFT suspension characteristic modes.

In the shown embodiment, roll-suppressive suspension control is then performed for suppressing vehicle roll based on the steering angular displacement detected by steering angle sensor, serving in this case as the driving condition monitoring means 14. On the other hand, pitch, i.e. scoot or nose-dive, is suppressed on the basis of engine acceleration and deceleration. Control characteristics during roll and/or pitch-suppressive suspension control are adjusted according to road roughness conditions. In practice, the vehicular roll criterion value, by reference to which HARD or SOFT suspension characteristics modes are selected, is selected from either a rough-road value or a smooth-road value, with the intent of avoiding the influence of kick-back in the steering mechanism, the intensity of which is greater on rough roads than on smooth roads. On the other hand, vehicular pitch criterion, by reference to which HARD or SOFT suspension characteristics are selected, is adjusted so as to avoid the influence of oscillation of the accelerator pedal and/or the driver's foot on rough roads.

The first and preferred embodiment of the automotive suspension control system, according to the present invention, will be described in detail hereinbelow with reference to FIGS. 2 to 7(B).

FIGS. 2 and 3 illustrates the preferred embodiment of the suspension control system according to the present invention. The vehicle has left-front, right-front, leftrear and right-rear wheels 30. The wheels (not shown) support the vehicle body (not shown) through corresponding suspension assemblies $18_{FL}$, $18_{FR}$, $18_{RL}$ and $18_{RR}$. In the shown embodiment, each suspension assembly $18_{FL}$, $18_{FR}$, $18_{RL}$ and $18_{RR}$ has a variable damping-force shock absorber 20 which can operate in any of a plurality of damping modes, including at least a HARD mode in which a relatively high damping force is produced, and a SOFT mode in which a relatively small damping force is produced. In order to switch among the various damping modes, each variable damping-force shock absorber 36 is associated with an actuator $12_{FL}$, $12_{FR}$. $12_{RL}$ and $12_{RR}$. The actuators $12_{FL}$, $12_{FR}$, $12_{RL}$ and $12_{RR}$ are all connected to a driver circuit 102. The driver circuit 102 is connected, in turn, to the controller 100 which comprises a microprocessor and produces control signals derived from detected vehicle driving conditions.

In order to monitor vehicle driving conditions, the controller 100 is connected for input from a steering angle sensor 104, a vehicle speed sensor 106, a fuel pulse sensor 108, a clutch switch 110 and a brake switch 112. Also, the controller 100 is connected to the road sensor 16. As is well known, the steering angle sensor 104 is mounted on a steering column 103 to monitor angular displacement of a steering wheel 103 and produces a steering angle indicative signal indicative thereof. The steering angle indicative signal is utilized as a parameter representative of rolling force and/or yawing force exerted on the vehicle. The fuel pulse sensor 108 monitors fuel injection pulse width and thus monitors acceleration and deceleration of the vehicle, both of which cause vehicular profile changes, i.e. winding-up or nose-dive. The fuel pulse sensor 108 produces a fuel pulse width indicative signal representative of the fuel pulse width supplied to a fuel supply system (not shown) in the automotive engine. The brake switch 112 detects application of automotive brakes (not shown) and produces a braking condition indicative signal. Similarly, the clutch switch 110 detects engagement and release of an automotive clutch associated with a power transmission and produces a clutch position indicative signal.

The road sensor 16 is arranged to monitor the vehicle height relative to the road surface. The road sensor 16 produces a road condition indicative signal representative of the roughness of the road surface.

The controller 100 derives control signals based on the various aforementioned sensor signals.

Suspension control in response to the steering angle indicative signal from the steering angle sensor has been disclosed in the co-pending U.S. patent application Ser. No. 678,806, filed on Dec. 6, 1984, and the corresponding European Patent Application which has been published under publication No. 01 45 013. Suspension control for suppressing winding-up and nose-dive has been disclosed in the co-pending U.S. patent application Ser. No. 649,484, filed Sept. 11, 1984, the corresponding European Patent Application of which has been published under publication No. 01 35 902, the co-pending U.S. patent application Ser. No. 791,061, filed on Oct. 24, 1985, and the co-pending Japanese Patent Application No. 59-11734 which has been published under the Publication No. 60-154906. Road condition-dependent and vehicular sway-dependent suspension control have been disclosed in the co-pending U.S. patent application Ser. No. 647,648, filed on Sept. 6, 1986, the co-pending U.S. patent application Ser. No. 706,279, filed on Feb. 27, 1985, the corresponding European Patent Application of which has been published under Publication No. 01 57 181, the co-pending U.S. patent application Ser. No. 744,379, filed on June 13, 1985, the corresponding European Patent Application of which has been published under Publication No. 01 66 313, and the co-pending U.S. patent application Ser. No. 751,513, filed on July 3, 1985, the corresponding European Patent Application of which has been published under Publication No. 01 67 455. All of the above-listed co-pending applications have been assigned to the owner of the present invention. The contents of the listed co-pending applications are hereby incorporated by reference for the sake of disclosure.

As shown in phantom line in FIG. 3, the controller 100 may include analog-to-digital (A/D) converters 114 and 116 in cases where the road sensor 16 and/or the steering angle sensor 104 employed in the suspension control system produce analog signals. In this case, the A/D converter 114 is connected to the road sensor 16 to receive an analog road condition indicative signal for conversion to a digital signal corresponding to the analog signal. On the other hand, the A/D converter 116 is connected to a steering angle sensor 104 to receive the steering angle indicative signal for conversion to a digital signal.

In practice, the steering angle sensor 104 produces a pulse signal at every predetermined angle of angular displacement of the steering column. This kind of steering angle sensors has been disclosed in Japanese patent First Publications (Tokkai) Showa 61-38515 and 61-61005, respectively published on Feb. 24, 1986 and Mar. 28, 1986. The contents of these prior publications are hereby incorporated by reference for the sake of disclosure. Since the steering angle sensor 104 employed in the practical embodiment produces a digital steering angle indicative signal, the A/D converter 116 is not required. On the other hand, in the practical embodiment, the road sensor 116 comprises a kind of potentiometer which produces an analog signal representative of the relative distance between the vehicle body and the wheel axle. The preferred embodiment of the road sensor 16 will be described later with reference to FIG. 5. Therefore, the A/D converter 114 is required to convert the analog road condition indicative signal from the road sensor 16 into a digital signal indicative thereof. On the other hand, when the road sensor comprises a sensor which produces a digital road condition indicative signal. such as an ultra-sonic sensor, the A/D converter can be omitted from the system Such an ultra-sonic sensor utilized for road-roughness monitoring has been disclosed in U.S. Pat. No. 4,600,215, issued on July 15, 1986, to Junsuke KUROKI et al and assigned to the assignee of the present invention. The contents of the aforementioned U.S. Patent are hereby incorporated by reference for the sake of disclosure. Although the preferred embodiment includes the road sensor 16 of FIG. 5, an ultra-sonic-type road sensor can be employed as a replacement for the sensor of FIG. 5.

The vehicle speed sensor 106 is of per se well-known construction and monitors the rate of rotation of a standard speedometer cable or of the output shaft of the power transmission or of the propeller shaft. As is well known, the vehicle speed sensor 106 produces a pulse signal serving as the vehicle speed indicative signal at each predetermined angular position of the rotating body. Therefore, the frequency of the pulse signal produced by the vehicle speed sensor is proportional to the vehicle speed.

The clutch switch 110 is held ON, i.e. closed, while the clutch is connected. On the other hand, the clutch switch 110 is turned OFF in response to release of the clutch. Similarly, the brake switch 112 turns ON in response to application of the vehicular brakes and remains OFF while the vehicular brakes are not applied. In practice, the clutch switch 110 may be a normally-closed switch disposed near a clutch pedal and open when the clutch pedal is fully depressed. On the other hand. the brake switch 112 is a normally-open switch and is disposed near a brake pedal so as to be turned on in response to depression of the brake pedal.

The road sensor 16, the steering angle sensor 104, the vehicle speed sensor 106, the fuel pulse sensor 108, the clutch switch 110 and the brake switch 112 are connected to an input/output interface of the microprocessor which constitutes the major part of the controller 100. The microprocessor includes CPU, RAM. ROM and a clock pulse generator. ROM has a program memory block 118 storing a roll-suppressive suspension control program and a pitch-suppressive suspension control program. ROM includes a roll criterion-representative reference value $\Delta\theta L_{ref}$ memory block 120. In the shown embodiment, the roll criterion-representative reference value memory block 120 is accessed while the road surface is smooth. ROM also includes another roll criterion-representative reference value $\Delta\theta H_{ref}$ memory block 122. The roll criterion-representative reference value memory block 122 is accessed while the road surface is rough. ROM also includes memory blockS 124, 126, 128, 130, 132, 134, 136, 138, 140, 142, 144 and 146. The memory blocks 124, 128, 152 respectively store scoot or winding-up criterion-representative reference values $\Delta PLa1_{ref}$, $\Delta PLa2_{ref}$ and $\Delta PLa3_{ref}$ which are selectively accessed depending upon the power transmission gear positions, i.e., first, second and third gear positions, while the vehicle is travelling on a smooth road. The memory blocks 126, 130, 134 respectively store nose-dive criterion-representative reference values $\Delta PLd1_{ref}$, $\Delta PLd2_{ref}$ and $\Delta PLd3_{ref}$ which are selectively accessed depending upon the power transmission gear positions, i.e., first, second and third gear positions, while on a smooth road. The memory blocks 136, 140, 144 respectively store scoot or winding-up criterion-representative reference values $\Delta PHa1_{ref}$, $\Delta PHd2_{ref}$ and $\Delta PHd3_{ref}$ which are selectively accessed depending upon the power transmission gear position i.e., first, second and third gear positions, while the vehicle is travelling on a rough road. The memory blocks 138, 142, 146 respectively stores nose-dive criterion-representative reference values $\Delta PHd1_{ref}$, $\Delta PHd2_{ref}$ and $\Delta PHd3_{ref}$ which are selectively accessed depending upon the power transmission gear position while on a rough road. ROM also includes a memory block 148 storing a road-roughness criterion-representative reference value $\Delta H_{ref}$.

The microprocessor also includes a vehicle speed counter 150 for counting a vehicle speed indicative pulses from the vehicle speed sensor 106 for a given unit of time defined by clock pulses from the clock pulse generator. The vehicle speed counter 150 outputs a vehicle speed value V indicative of the vehicle speed. The microprocessor also has a fuel pulse counter which counts clock pulses in order to measure the pulse width of the fuel pulse indicative signal from the fuel pulse sensor 158. The fuel pulse indicative signal from the fuel pulse sensor 108 may have a pulse width corresponding to the fuel injection pulse supplied to the fuel supply system of the automotive engine. The fuel supply pulse width varies with engine load, i.e. it depends mainly upon acceleration and deceleration of the engine, so that the fuel pulse counter value Pn represents engine load. Its derivative $\Delta Pn$ thus represents acceleration and deceleration of the vehicular engine. The fuel pulse counter 152 produces a fuel pulse width indicative signal. A steering angle counter 154 is also increments or decrements its counter value in response to the steering angle indicative signal from the steering angle sensor 104. In practice, the steering angle indicative signal contains a component indicative of the steering direction. clockwise or counterclockwise. Therefore, the steering angle counter 154 increments and decrements the counter value depending upon the steering direction. In the shown embodiment, the steering angle counter 154 decrements its counter value when the steering angle indicative signal has a steering direction indicative component indicative of a turn to the left, and increments its counter value in response to a steering angle indicative signal indicative of a right-hand turn.

A register 156 is provided for temporarily storing the steering angle counter value $\theta$. The register value $\theta$ is updated everytime the roll-suppressive suspension control program is executed. A register 158 is also provided in the microprocessor for storing a road condition indicative value $\Delta H$.

In general, the road roughness condition is recognized on the basis of the frequency and amplitude of the road condition indicative signal. The road condition indicative signal includes high-frequency components representative of the vibration of the road wheels and low-frequency components representative of vehicle body vibrations. In the road roughness value derivation process, the instantaneous value H of the road condition indicative signal from the road sensor 16, which is representative of the height of the vehicle above the wheel assembly, is read and used to derive a weighted average value $H_{ave}$. In practice, average value $H_{ave}$ of the road condition indicative signal value H is calculated by updating the previous average with a value derived from the instantaneous road sensor signal value H according to the following equation:

$$H_{ave} = H_{ave0} + 1/64 \cdot (H - H_{ave0})$$

where $H_{ave0}$ is the average value of the road sensor signal value derived in the immediately preceding cycle of program execution.

Then, the absolute difference value $\Delta H$ $(=|H_{ave} - H|)$ is calculated. This absolute difference value $\Delta H$ serves as the road condition indicative value $\Delta H$ to be stored in the register 158. The process of derivation of the road condition indicative value $\Delta H$ has been disclosed in detail in the aforementioned co-pending U.S. patent application Ser. No. 751,513. The contents of this U.S. patent application Ser. No. 751,513 are hereby incorporated by reference for the sake of disclosure.

CPU of the microprocessor executes the roll-suppressive suspension control program and the pitch-suppressive suspension control program stored in the program memory block 118. The execution of the aforementioned programs will be described later with reference to FIGS. 6, 7(A) and 7(B).

Figure 4:
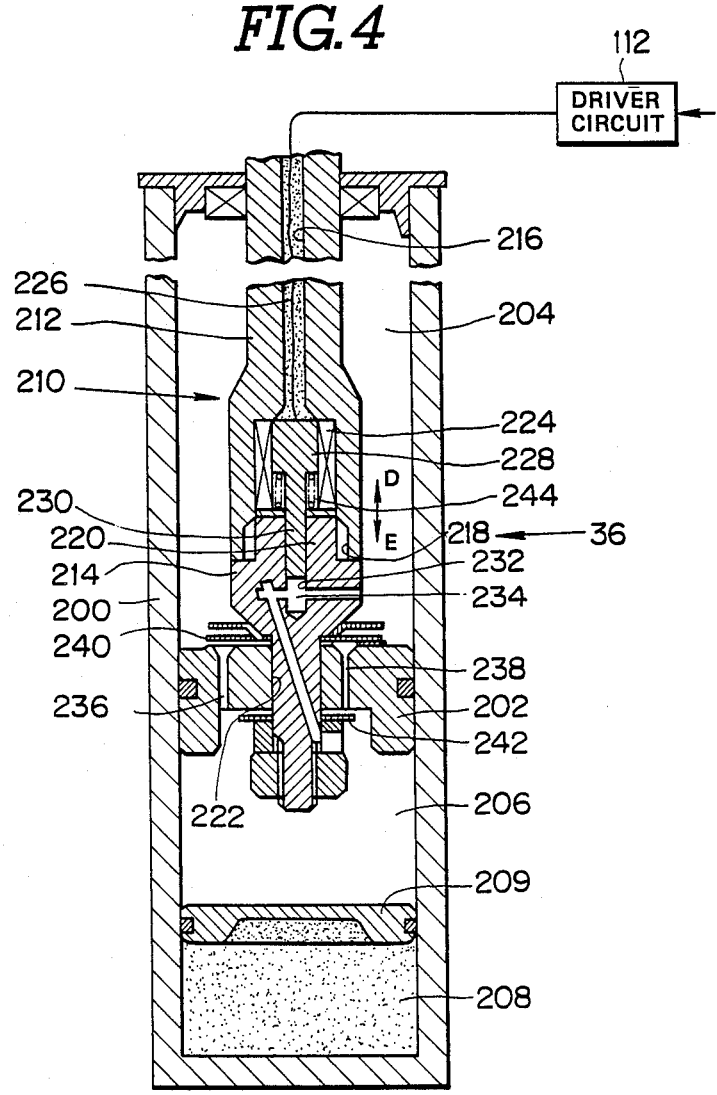
FIG. 4 is a cross-section through a variable-damping-force shock absorber employed in the preferred embodiment of the suspension control system of FIG. 2.
Figure 5:
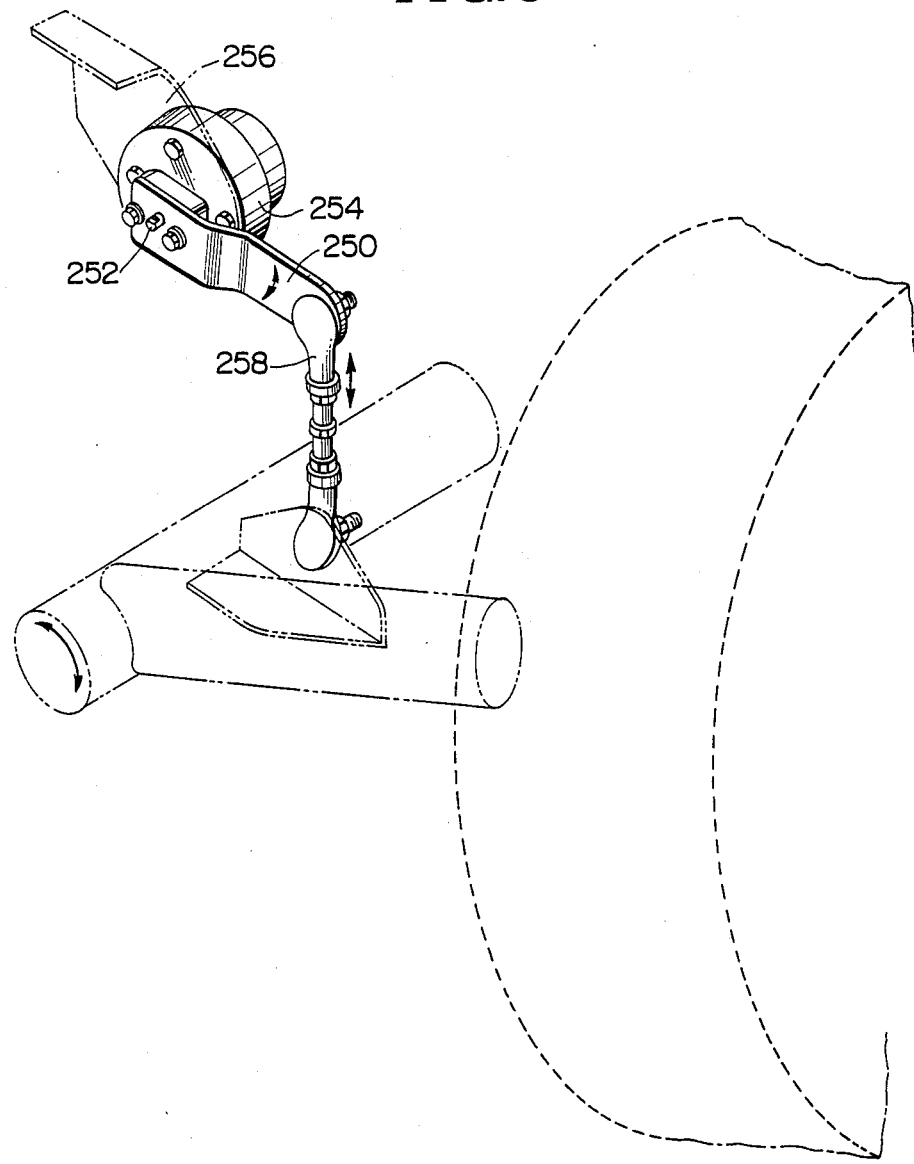
FIG. 5 is a perspective view of a road sensor for monitoring road surface conditions, i.e. road roughness, employed in the preferred embodiment of the suspension control system of FIG. 2.

FIG. 4 shows the first embodiment of the variable damping-force shock absorber 36 employed in the preferred embodiment of the suspension control system of FIGS. 2 and 5. The shock absorber 20 generally comprises a hollow cylinder 200, and a piston 202 fitting flush within the hollow interior of the cylinder 200. The piston 202 defines upper and lower fluid chambers 204 and 206 within the cylinder 200. The cylinder 200 further defines a pneumatic chamber 208 partitioned from the lower fluid chamber 206 by means of a movable disc-shaped partition 209. The pneumatic chamber 208 is filled with a compressed gas.

The piston 202 is connected to the vehicle body (not shown) by means of a piston rod which is generally referred to by the reference number 210. The piston rod 210 comprises upper and lower segments 212 and 214. The upper segment 212 has an axial through opening 216. The lower end of the through opening 216 opens into a recess 218 in the lower end of the upper segment 212. On the other hand, the lower segment 214 has an upper section 220 engageable to the recess 218. A hole 222 is defined in the upper segment 212 of the piston rod 210 to receive the actuator 12 extending through the through opening 216. The actuator 12 is connected to the driver circuit 102 through a lead 126. The actuator 12 is associated with a movable valve body 228 which has a lower end extension 230 inserted into a guide opening 232 defined in the lower segment 214. The guide opening 232 extends across a fluid passage 234 through the lower segment 214 for fluid communication between the upper and lower fluid chambers 204 and 206.

The fluid passage 234 serves as a bypass for flow-restrictive fluid passages 220 and 238 in the piston 202. The upper end of the fluid passage 238 is closed by a resilient flow-restricting valve 240. Similarly, the lower end of the fluid passage 236 is closed by a flow-restricting valve 242. The flow-restricting valves 240 and 242 serve as check valves establishing one-way fluid communication in opposite directions. In addition, since the flow-restriction valves 240 and 242 are biased toward the ends of the fluid passages 236 and 238, they open to allow fluid communication between the upper and lower fluid chambers 204 and 206 only when the fluid pressure difference between the upper and lower chambers 204 and 206 overcomes the effective pressure of the valves.

The cross-sectional area of the fluid passages 236 and 238 and the set pressures of the fluid-restriction valves 240 and 242 determine the damping force produced in HIGH damping force mode. The cross-sectional area of the fluid passage 234 determines the drop in the damping force in the LOW damping force mode in comparison with that in the HIGH damping force mode.

The movable valve body 228 is normally biased upwards by means of a coil spring 244. As a result, when the actuator 12 is not energized, the lower end section 230 of the valve body 228 is separated from the fluid passage 234 to allow fluid communication between the upper and lower chamber. When the actuator 12 is energized, the valve body 228 moves downwards against the resilient force of the coil spring 244 to block the fluid passage 234 with the lower end extension 230. As a result, fluid communication between the upper and lower fluid chambers 204 and 206 via the fluid passage 234 is blocked. When fluid communication through the fluid passage is permitted, the damping force produced by the shock absorber 20 remains LOW. On the other hand, when the fluid passage 234 is shut, fluid flow rate is reduced, thus increasing the damping force produced. Therefore, when the valve body 228 is shifted to the lowered position, the shock absorber works in HIGH damping force mode to produce a higher damping force against vertical shocks.

In the normal state wherein the control signal of the controller 100 remains LOW, the movable valve body is held in its upper position by the effect of the spring force so that the lower end extension 230 does not project into the fluid passage 234. Therefore, the fluid communication is established through both the fluid passage 234 and the applicable one of the flow-restricting fluid passages 236 and 238. As a result, the total flow restriction is relatively weak to allow the shock absorber to operate in SOFT mode.

In response to a HIGH-level control signal from the controller 100, the driver signal generator 102 corresponding to each shock absorber 20 becomes active to energize the actuator 12. The actuator 12 drives the movable valve body 228 downward. This downward movement shifts the lower end of the extension 230 of the valve body 228 into the fluid passage 234 so as to block fluid communication between the upper and lower fluid chambers 204 and 206 via the fluid passage 234. Therefore, the fluid can flow between the upper and lower chambers 204 and 206 only through one of the fluid passages 236 and 238. The fluid flow restriction is, thus, increased, resulting in a greater damping force than is produced in the SOFT mode. In other words, the shock absorber 20 operates in HARD mode.

FIG. 5 shows the preferred embodiment of the road sensor 16 to be employed in the suspension control system according to the invention of FIGS. 1 to 5. As shown in FIG. 5, the road sensor 16 has a pivotal lever 250 fixed to a rotary shaft 252. The rotary shaft 252 extends into a sensor housing 254. The sensor housing 254 is fixed to the vehicle body by means of a mounting bracket 256. A rotary element (not shown) which constitutes the moving component of a conventional potentiometer, is housed within the sensor housing 254 and fixed to the rotary shaft 252 for rotation therewith. In the preferred embodiment, the pivotal lever 250 is free to pivot through an angular range of 45° to either side of its neutral position. The output voltage of the potentiometer housed within the sensor housing increases and decreases with the angular position of the pivotal lever 250. In practice, the potentiometer is adjusted so as to output zero volts while the pivotal lever 250 is its neutral position. The output voltage of the potentiometer increases linearly as it pivots upward and decreases linearly as it pivots downward.

A linkage 258 is connected to the free end of the pivotal lever 250 at its upper end. The lower end of the linkage 258 is connected to a wheel assembly such as a suspension arm, a suspension link and so forth. Depending upon the displacement of the wheel assembly relative to the vehicle body in bounding and rebounding direction, the pivotal lever 250 is driven up and down.

Therefore, the relative displacement between the vehicle body and the wheel assembly is converted into rotation or pivotal movement of the potentiometer and then converted into electric voltage which serves as the road condition indicative signal.

I practice, the road sensor 16 cooperates with one of the front wheel to monitor the relative displacement between the vehicle body and the associated front wheel assembly. Preferably, the road sensor 16 is associated with the front left wheel to monitor the relative displacement between the vehicle body and the front left wheel assembly.

FIG. 6 is a flowchart of the roll-suppressive suspension control program stored in the program memory block 118 of ROM and executed by CPU at a regular intervals. In practice, the roll-suppressive suspension control program of FIG. 6 is executed at constant time intervals, e.g. every 20 msec.

Immediately after starting execution of the roll-suppressive suspension control program, the steering angle counter value $\theta$ in the steering angle counter 154, which represents the instantaneous steering angular position, is read out at a step 1002. The read steering angle counter value $\theta$ is used to derive the angular displacement from the immediately preceding steering angular position. Toward this end, the previous steering angular position indicative value is read from a register 156 storing the steering angle counter value read in the immediately preceding cycle of program execution, at a step 1004. Based on the values read from the steering angle counter 154 and the steering angular position indicative value register 156, the steering angular displacement $\Delta\theta$ is derived at the step 1004. Also, after derivation of the steering angular displacement $\Delta\theta$, the contents of the register 156 are updated by the steering angle counter value read at the step 1002. After step 1004, the vehicle speed counter value in the vehicle speed counter 150 is read out at a step 1006 and the road condition indicative value $\Delta H$ is read out from the register 158 at a step 1008.

The road condition indicative value $\Delta H$ is compared with a smooth/rough road criterion indicative reference value $\Delta H_{ref}$ at a step 1010. When the road condition indicative value $\Delta H$ is less than or equal to the reference value $\Delta H_{ref}$ when compared at the step 1010, a roll criterion indicative reference value $\Delta\theta_{ref}$, which is to be compared with the steering angular displacement indicative value $\Delta\theta$ derived at the step 1004, is set to a lower value. Therefore, the memory block 120 in ROM is accessed to retrieve the stored value $\Delta\theta L_{ref}$ for use as the reference value $\Delta\theta_{ref}$, at a step 1012. Then at a step 1016, the steering angular displacement indicative value $\Delta\theta$ is compared with the reference value $\Delta\theta_{ref}$ (i.e. $\Delta\theta L_{ref}$).

If the steering angular displacement indicative value $\Delta\theta$ is greater than or equal to the reference value $\Delta\theta_{ref}$, a control signal ordering HARD suspension characteristics mode is output at a step 1018. Thereafter, a timer 160 is set at a given period of time $T_R$ which is a predetermined period of time for which to hold the suspension characteristics in HARD mode for suppressing vehicular roll, at a step 1020.

On the other hand, when the road condition indicative value $\Delta H$ is greater than the reference value $\Delta H_{ref}$ when compared in the step 1010, then the higher reference value $\Delta\theta H_{ref}$ is selected at a step 1014. Therefore, at the step 1014, the memory block 122 is accessed to read the stored higher reference value $\Delta\theta H_{ref}$ for use as the reference value $\Delta\theta_{ref}$. Then at a step 1016, the steering angular displacement indicative value $\Delta\theta$ is compared with the reference value (i.e. $\Delta\theta H_{ref}$).

Similarly to the above, when the steering angular displacement indicative value $\Delta 0$ is greater than or equal to the reference value $\Delta\theta_{ref}$, a control signal ordering HARD suspension characteristics mode is output at a step 1018. Thereafter, a timer 160 is set at a given period of time $T_R$ which is a predetermined period of time for which to hold the suspension characteristics in HARD mode for suppressing vehicular roll, at a step 1020.

If the steering angular displacement indicative value $\Delta\theta$ is less than the reference value $\Delta\theta_{ref}$ (i.e. $\Delta\theta H_{ref}$) when checked at the step 1016, then the timer value $T_R$ in the timer 160 is checked to see if the timer value is zero, at a step 1022. Once the timer value $T_R$ reaches zero when checked at the step 1022, then a control signal ordering the SOFT suspension characteristics is output at a Step 1026. Otherwise, namely while the timer value $T_R$ is greater than zero, then the timer value $T_R$ is decremented by 1 at a step 1024.

Following any one of the steps 1020, 1024 and 1026, the program execution goes END.

As will be appreciated herefrom, according to the preferred process, sensing ability of the vehicular roll condition is lowered while the vehicle is travelling along a rough road to avoid mis-detection of vehicular roll due to kick-back from the road surface to the steering mechanism.

Figure 7A:
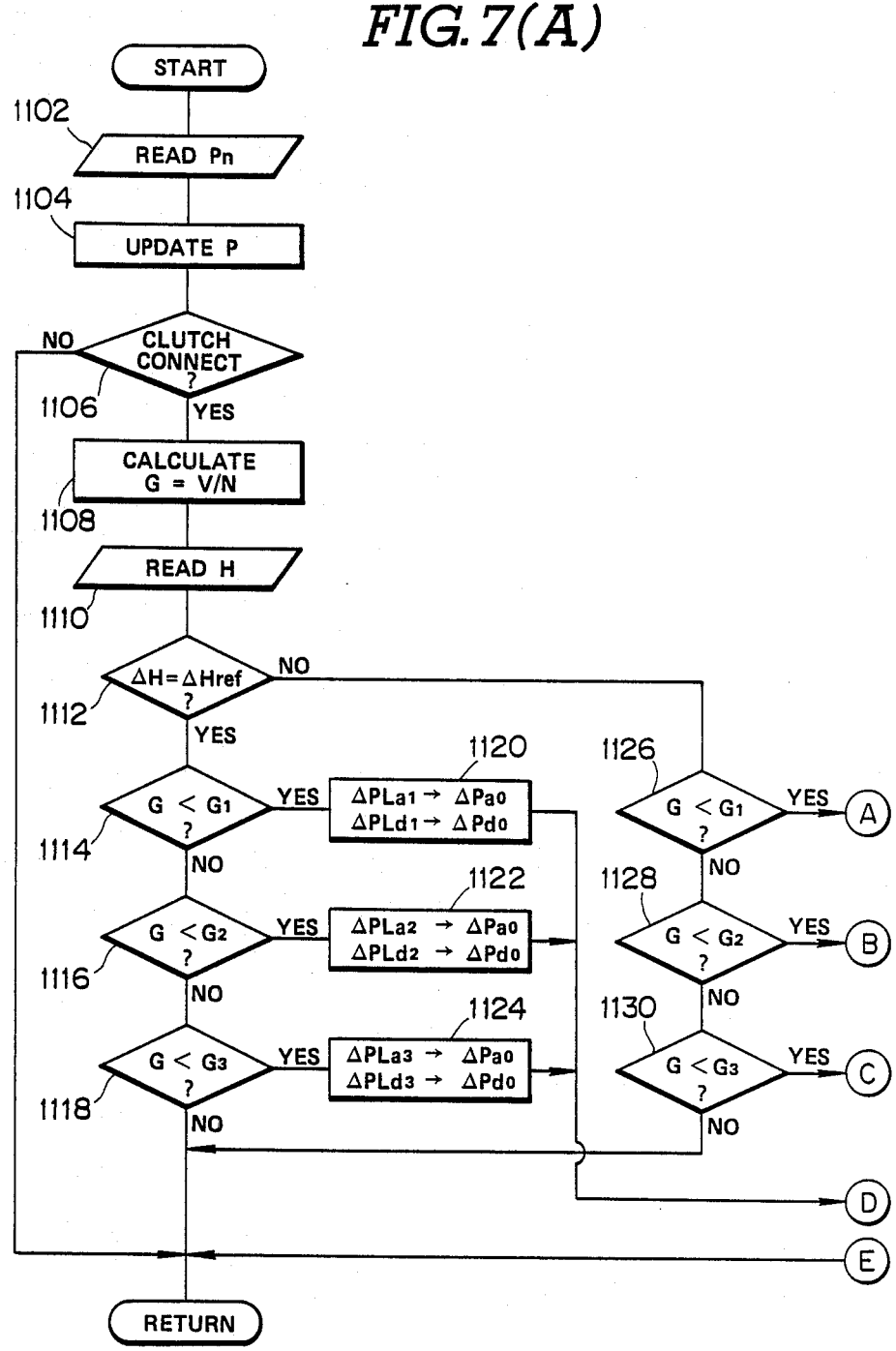
FIGS. 7(A) and 7(B) together form a flowchart of a pitch suppressive suspension control program executed by the controller of FIG. 5.
Figure 7B:
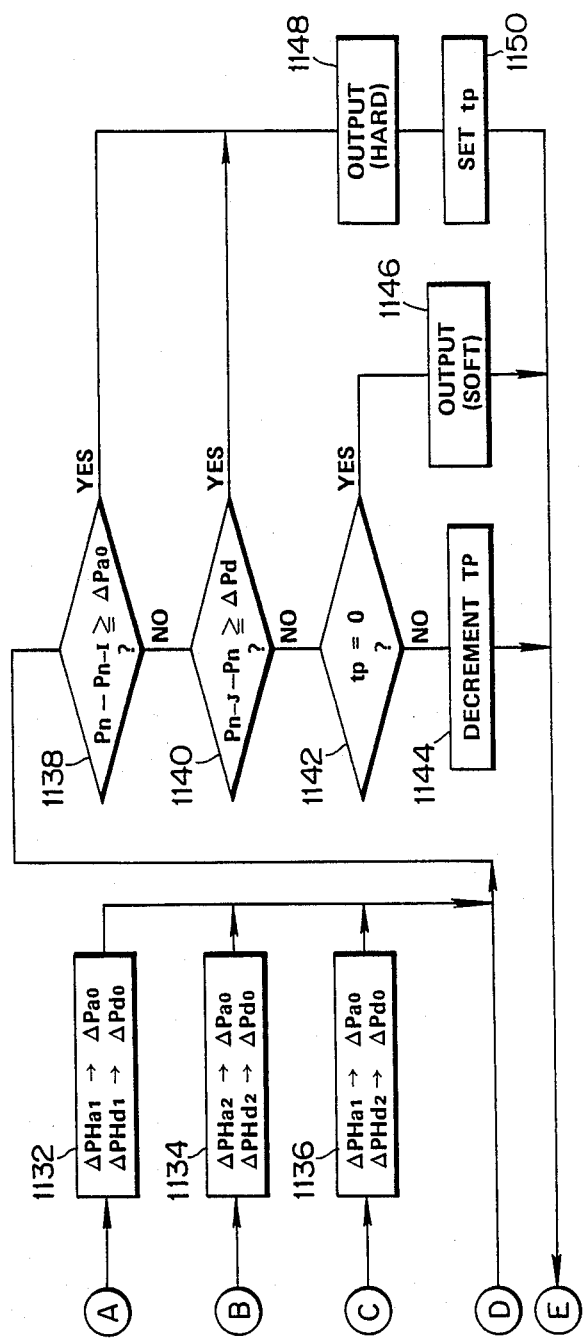
Figure 11:
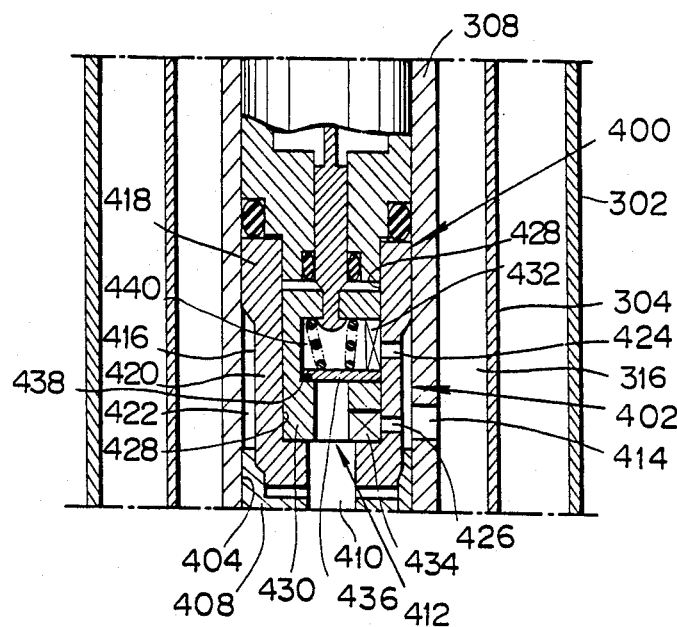
FIG. 11 is an enlarged partial section through the major part of the three-way adjustable shock absorber of FIG. 9.

FIGS. 7(A) and 7(B) show a pitch suppressive suspension control program for suppressing winding-up during acceleration of the vehicle and nose-dive during deceleration of the vehicle.

As set forth above, in the shown embodiment, vehicle acceleration and deceleration is generally detected on the basis of the fuel supply pulse width $P_n$, since the fuel supply pulse width generally varies with the induction air flow rate and thus corresponds to engine load. The fuel pulse width $P_n$ is measured by the fuel pulse counter 152. The fuel pulse counter value $P_n$ is read out at a step 1102 from the fuel pulse counter 152. The read fuel pulse counter value $P_n$ is transferred to a shift register 162 storing previous fuel pulse counter values $P_{n-1}$ and $P_{n-2}$ from the immediately preceding cycle and from two cycles before. At a step 1104, the contents of the shift register 162 are updated with the instantaneous fuel pulse counter value $P_n$ and the immediately preceding fuel pulse counter value $P_{n-1}$.

Thereafter, the clutch position indicative signal level is checked at a step 1106. When the clutch position indicative signal level is LOW, indicative of the OFF position of the clutch switch and thus of clutch release, the program ends immediately. On the other hand, when the clutch position indicative signal level is HIGH, indicating clutch engagement, the automotive power transmission gear position is arithmetically detected at a step 1108. Basically, the transmission gear position can be derived from the vehicle speed V which is monitored by the vehicle speed counter 150 and the engine speed N which can be derived from the period of the fuel supply pulse. The ratio ($G=V/N$) of the vehicle speed V versus the engine speed N is derived at the Step 1108. The ratio G serves as the transmission gear position indicative value.

The road condition indicative value $\Delta H$ is read out from the register 158 at a step 1110. The road condition indicative value $\Delta H$ is compared with a smooth/rough road criterion indicative reference value $\Delta H_{ref}$ at a step 1112. When the road surface is relatively smooth and thus the road condition indicative value $\Delta H$ is less than or equal to the reference value $\Delta H_{ref}$ when compared at the step 1112, the transmission gear position indicative value G is compared with a first gear position reference value $G_1$ which represents the maximum possible value of the ratio of the vehicle speed V versus the engine speed N in the power transmission first gear position, at a step 1114. If the transmission gear position indicative value G is greater than or equal to the first gear position reference value $G_1$, the value G is compared with a second gear position reference value $G_2$ which represents the maximum possible value of the ratio of the vehicle speed V versus the engine speed N in the power transmission second gear position, at a step 1116. If the transmission gear position indicative value G is greater than or equal to the second gear position reference value $G_2$, the value G is compared with a third gear position reference value $G_3$ which represents the maximum possible value of the ratio of the vehicle speed V vis-versus the engine speed N at the power transmission first gear position, at a step 1118.

If the transmission gear position indicative value G is still greater than or equal to the third gear position reference value $G_3$, then the program ends.

It should be noted that in the over-drive gear positions, e.g. fourth and fifth gear positions, acceleration and deceleration change very gradually as engine speed changes, and so there will not be much winding-up or nose-dive. Therefore, in fourth and fifth transmission gear positions, pitch-suppressive suspension control depending upon the engine speed is not performed in the shown embodiment. However, if desired, it would be possible to perform pitch-suppressive suspension control even in the fourth and fifth gear positions of the power transmission. In this case, additional steps will be required for comparing the transmission gear position indicative value G with the fourth and fifth gear position reference values.

If the transmission gear position indicative value is less than the first gear position reference value $G_1$ when compared at the step 1114, then, the memory blocks 124 and 126 are accessed at a step 1120 to read first gear position acceleration and deceleration reference values $PLa1_{ref}$ and $PLd1_{ref}$. Similarly, if the transmission gear position indicative value is less than the second gear position reference value $G_2$ when compared at the step 1116, then, the memory blocks 128 and 130 are accessed at a step 1122 to read second gear position acceleration and deceleration reference Values $PLa2_{ref}$ and $PLd2_{ref}$. Similarly, if the transmission gear position indicative value is less than the third gear position reference value $G_3$ when compared at the step 1118, then, the memory blocks 132 and 134 are accessed at a step 1124 to read third gear position acceleration and deceleration reference values $PLa3_{ref}$ and $PLd3_{ref}$.

On the other hand, when the road surface is relatively rough and thus the road condition indicative value $\Delta H$ is greater than the reference value $\Delta H_{ref}$ when compared at the step 1112, the transmission gear position indicative value G is compared with a first gear position reference value $G_1$ which represents the maximum possible value of the ratio of the vehicle speed V versus the engine speed N at the power transmission first gear position, at a step 1126. If the transmission gear position indicative value G is greater than or equal to the first gear position reference value $G_1$, the value G is compared with a second gear position reference value $G_2$ which represents the maximum possible value of the ratio of the vehicle speed V versus the engine speed N at the power transmission second gear position, at a step 1128. If the transmission gear position indicative value G is greater than or equal to the second gear position reference value $G_2$, the value G is compared with a third gear position reference value $G_3$ which represents the maximum possible value of the ratio of the vehicle speed V versus the engine speed N at the power transmission first gear position, at a step 1130.

If the transmission gear position indicative value G is still greater than or equal to the third gear position reference value $G_3$, then the program ends.

If the transmission gear position indicative value is less than the first gear position reference value $G_1$, then, the memory blocks 136 and 138 are accessed at a step 1132 to read first gear position acceleration and deceleration reference values $PHa1_{ref}$ and $PHd1_{ref}$. Similarly, if the transmission gear position indicative value is less than the second gear position reference value $G_2$, then, the memory blocks 128 and 130 are accessed at a step 1134 to read second gear position acceleration and deceleration reference values $PHa2_{ref}$ and $PHd2_{ref}$. Similarly, if the transmission gear position indicative value is less than the third gear position reference value $G_3$, then, the memory blocks 132 and 134 are accessed at a step 1136 to read third gear position acceleration and deceleration reference values $PHa3_{ref}$ and $PHd3_{ref}$.

It should be appreciated that the values $PLa1_{ref}$, $PLa2_{ref}$ and $PLa3_{ref}$ and $PHa1_{ref}$, $PHa2_{ref}$ and $PHa3_{ref}$ serve as acceleration reference values at the associated transmission gear positions, which acceleration reference values will be generally referred to as "$Pa_{ref}$". On the other hand $PLd1_{ref}$, $PLd2_{ref}$ and $PLd3_{ref}$ and $PHd2_{ref}$ and $PHd3_{ref}$ serve as deceleration reference values at the associated transmission gear positions, which deceleration reference values will be hereafter generally referred to as "$Pd_{ref}$". The values $PHa1_{ref}$, $PHa2_{ref}$ and $PHa3_{ref}$ are greater than the values $PLa1_{ref}$, $PLa2_{ref}$ and $PLa3_{ref}$ at the corresponding gear positions. Similarly, the values $PHd1_{ref}$, $PHd2_{ref}$ and $PHd3_{ref}$ are greater than the values $PLd1_{ref}$, $PLd2_{ref}$ and $PLd3_{ref}$ at the corresponding gear positions.

At a step 1138, the difference $\Delta P_n$ ($=P_n-P_{n-1}$) between the instantaneous and immediately preceding fuel pulse counter values is derived and compared with the acceleration reference value $Pa_{ref}$. If the difference $\Delta P_n$ is less than the acceleration reference values $Pa_{ref}$ then the difference $\Delta P_n$ is compared with the deceleration reference value $Pd_{ref}$, at a step 1140.

If the difference $\Delta P_n$ is greater than or equal to the acceleration reference value $Pa_{ref}$ or less than or equal to the deceleration reference value $Pd_{ref}$, then, control passes to a step 1148 to output the control signal ordering HARD suspension characteristics. After hardening the suspension, a timer 164 is set to the given value $T_P$, at a step 1150. On the other hand, if the difference $\Delta P_n$ is greater than the deceleration reference value $Pd_{ref}$ when compared at the step 1140, the timer value is checked to see if the timer value is zero which represents expiration of the set time $T_P$, at a step 1142. If the timer value of the timer 164 is not zero, then the timer value is decremented by one, at a step 1144. On the other hand, when the value of the timer 164 is zero when checked at the step 1142, then, the control signal ordering the SOFT suspension characteristics mode is output, at a step 1146.

As will be appreciated herefrom, by lowering the sensitivity to pitch on rough roads, mis-detection of possible acceleration and deceleration due to unnecessary vibration or operation of the accelerator pedal can be successfully avoided.

The effect of the preferred embodiment of the suspension control system with the road condition dependent variable sensing ability will be clearly seen from FIG. 8. In FIG. 8, a rough road surface is detected during the period of time from $t_1$ to $t_2$. During this $t_1$-$t_2$ period, the sensitivity to vehicular roll and vehicular pitch are lowered as set forth above. As a result, steering angular displacements exceeding the vehicular roll criterion during the periods $T_1$ and $T_4$ are ignored. Similarly, fuel pulse width increase at a rate greater than the vehicular pitch criterion during the period $T_2$ is also ignored.

On the other hand, relatively large steering angle displacements occuring during the period $T_3$ can trigger hardening of the suspension characteristics. In addition, after leaving the rough road, i.e. after the time $t_2$, the sensitivity is returned to the normal level. Therefore, fuel pulse width variations in the period $T_5$ at rates essentially equal to or slightly less than those occurring in the period $T_2$ would trigger hardening of the suspension characteristics.

This suspension control behaviour compares favorably with that of previously proposed suspension control systems, in which the suspension characteristics would change over to hardened characteristics in all of the periods $T_1$, $T_2$, $T_3$, $T_4$ and $T_5$. As apparent herefrom, by lowering the sensitivity, unnecessary hardening of the suspension can be avoided. This has the subsidiary benefit of limiting operation of the actuator used to adjust the suspension characteristics and thus expands the lifetime of the actuator.

FIGS. 9 to 12 show a modified form of the variable-damping-characteristic shock absorber of FIG. 4. In this modification, the shock absorber 36 can be operated in any of three modes, namely HARD mode, SOFT mode and MEDIUM mode, in the last of which damping characteristics intermediate to those of HARD mode and SOFT mode are achieved.

The hydraulic shock absorber 36 has coaxial inner and outer cylinders 302 and 304. Top and bottom ends of the cylinders 302 and 304 are plugged with fittings 306 and 303. The fitting 306 includes a seal 307 which establishes a liquid-tight seal. A piston rod 308 extends through an opening 12 formed in the fitting and is rigidly connected to a vehicle body (not shown) at its top end. The piston rod 308 is, in turn, connected to a piston 314 reciprocally housed within the inner cylinder 302 and defining upper and lower fluid chambers 316 and 318 therein.

The piston 314 was fluid passages 320 and 322 connecting the upper and lower fluid chambers 316 and 318. The piston 314 also has annular grooves 324 and 326 along its upper and lower surfaces concentric about its axis. The upper end of the fluid passage 320 opens into the groove 324. On the other hand, the lower end of the fluid passage 322 opens into the groove 326. Upper and lower check valves 328 and 330 are provided opposite the grooves 324 and 326 respectively to close the grooves when in their closed positions. The lower end of the fluid passage 320 opens onto the lower surface of the piston at a point outside of the check valve 320. Likewise, the upper end of the fluid passage 322 opens onto the upper surface of the piston at a point outside of the check valve 328.

Therefore, the fluid passage 522 is active during the piston expansion stroke, i.e. during rebound of the shock absorber. At this time, the check valve 328 prevents fluid flow through the fluid passage 320. On the other hand, during the piston compression stroke, i.e. during bounding movement of the suspension, the fluid passage 320 is active, allowing fluid flow from the lower fluid chamber 318 to the upper fluid chamber 316 and the fluid passage 322 is blocked by the check valve 330.

The piston rod 308 has a hollow cylindrical shape so that a damping force adjusting mechanism, which will be referred to generally by the reference numeral "400" hereafter, can be housed therein. The damping force adjusting mechanism 400 includes a valve mechanism 402 for adjusting the cross-sectional area through which the working fluid can flow between the upper and lower chambers. In the preferred embodiment, the valve mechanism 402 allows three steps of variation of the damping force, i.e., HARD mode, MEDIUM mode and SOFT mode, the narrowest cross-sectional area representing the HARD mode, the widest the SOFT mode and intermediate the MEDIUM mode. Although the preferred embodiment of the invention will be described hereafter in terms of a three-way, adjustable-damping-force shock absorber, the number of adjustable positions of the shock absorber may be increased or decreased as desired and is not limited to this example.

As shown in FIG. 10, the piston rod 308 defines an axial through opening 404 with the lower end opening into the lower fluid chamber 318. A fitting 408 seals the lower end of the opening 404 of the piston rod and has an axial through opening 410, the axis of which is parallel to the axis of the through opening 404 of the piston rod. Thus, the through openings 404 and 410 constitute a fluid path 412 extending through the piston rod. The piston rod 308 also has one or more radial Orifices or openings 414 opening into the upper fluid Chamber 316. Thus, the upper and lower fluid chambers 316 and 318 are in communication through the fluid path 412 and the radial orifices 414.

A stationary valve member 416 with a flaring upper end 418 is inserted into the through opening 404 of the piston rod. The outer periphery of the flaring end 418 of the stationary valve member 416 is in sealing contact with the internal periphery of the through opening. The stationary valve member 416 has a portion 420 with a smaller diameter than that of the upper end 418 and so as to define an annular chamber 422 in conjunction with the inner periphery of the through opening 404 of the piston rod. The stationary valve member 416 has two sets of radially extending orifices 424 and 426 and an internal space 428. The radially extending orifices 424 and 426 establish communication between the internal space 428 and the annular chamber 422. A movable or rotary valve member 430 is disposed within the internal space 428 of the stationary valve member 416. The outer periphery of the rotary valve member 430 slidingly and sealingly contacts the inner surface of the stationary valve member 416 to establish a liquid-tight seal therebetween. Radially extending orifices 432 and 34 are defined in the rotary Valve member 430 at positions opposite the orifices 424 and 426 of the stationary valve member 416.

As shown in FIGS. 11(A) and 11(B), the orifices 424 and 426 respectively include first, second and third orifices 424a, 424b, 424c, and 426a, 426b and 426c. The first orifices 424a and 426a have the narrowest cross-sections and the orifices 432 and 434 are adapted to be in alignment with the first orifices to establish fluid communication between the upper and lower fluid chambers 316 and 318 in the case of the HARD mode. The third orifices 424c and 426c have the widest cross-sections and the orifices 432 and 434 are adapted to be in alignment with the third orifices in the case of the SOFT mode. The cross-sections of the second orifices 424b and 426c are intermediate those of the first and third orifices and the orifices 432 and 424 are adapted to align therewith in the case of the MEDIUM mode.

A check valve 436 is built into the rotary valve member 430. The check valve 436 is normally biased towards a valve seat 458 by means of a bias spring 44c so as to allow one-way fluid flow from the lower fluid chamber to the upper fluid chamber. This causes the bound damping force to be somewhat weaker than the rebound damping force.

The rotary valve member 430 is associated with an electrically operable actuator such as an electrical step motor 442 through a differential gear unit 444 and an output shaft 446 as shown in FIG. 12. A potentiometer 448 is associated with the output shaft 446. The potentiometer 448 includes a movable contact 450 with contactors 450a, 450b and 450c. The contactors 450a, 450b and 450c are adapted to slidingly contact stationary contact elements 452a, 452b and 452c of a stationary contact 452. According to the electrical connections between the movable contact and the stationary contact, the potentiometer 448 produces a mode signal representative of the rotary valve position and thus indicative of the selected mode of the damping force adjusting mechanism. The step motor 442 is electrically connected to the controller 100 to receive the control signal as a mode selector signal which drives the motor 442 through an angle corresponding to the rotary valve movement to the corresponding valve position. In this case, the potentiometer will return the mode signal as a feedback signal to indicate the instantaneous valve position.

It should be appreciated that the controller 100 may be operated either in automatic mode or in manual mode.

Returning to FIG. 9, the shock absorber has a fluid reservoir chamber 332 between its inner and outer cylinders 302 and 304, which fluid reservoir chamber 332 is in communication with the lower fluid chamber 318 via the bottom fitting 305 described previously. The bottom fitting 305 may serve to produce damping force in cooperation with the piston and the damping force adjusting mechanism during bounding and rebounding motion of the vehicle. A relatively low pressure pneumatic chamber 336 is also defined between the inner and outer cylinders 302 and 304.

Figure 12A:
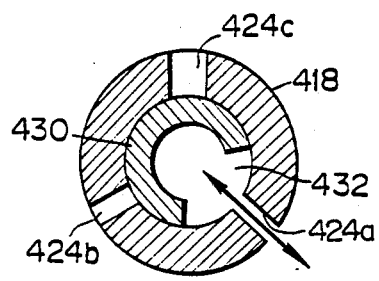
FIGS. 12(A) and 12(B) are further-enlarged sections taken along lines A—A and B—B of FIG. 10.
Figure 12B:
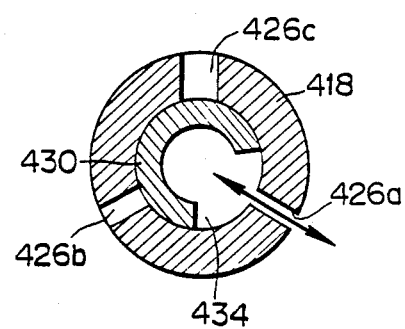

The operation of the damping force adjusting mechanism 400 will be briefly described herebelow with reference to FIG. 12. FIGS. 12(A) and 12(B) show the case of the HARD mode. In this case. the orifice 432 of the rotary valve 430 is in alignment with the orifices 424a and the orifice 434 is in alignment with the orifice 426a. During vehicle rebounding motion, i.e., in the piston compression stroke, the fluid flows from the upper fluid chamber 316 to the lower fluid chamber 318 though the orifice 426a. On the other hand, during vehicle bounding motion, the fluid flows from the lower fluid chamber 318 to the upper fluid chamber 316 through orifices 424a and 426a. Since the first orifices 424a and 426a are the narrowest, the damping force produced in this mode is the highest among the three selectable modes.

In case of the MEDIUM mode, the orifices 432 and 424 of the rotary valve member 430 are respectively in alignment with the second orifices 424b and 426b.

In case of the SOFT mode, the orifices 432 and 434 align with the third orifices 424c and 426c, respectively to cause fluid flow. Since the third orifices 424c and 426c are the widest of the three sets, as described above, the damping force created in this SOFT mode is the lowest.

According to the shown embodiment, the electric step motor 442 is connected to the controller 100 through the driver circuit 102. Similarly to the case of the two-way shock absorber, the controller 100 selects any appropriate damping force state in accordance with detected road surface conditions but in this case produces a three-way control signal for actuating the shock absorber to one of the SOFT, MEDIUM and HARD modes. The driver circuit 102 is responsive to the control signal to drive the step motor 442 to operate the rotary valve member 430 to the corresponding valve position.

As an alternative in the modification set forth above. only SOFT and MEDIUM modes may be used for roll-suppressive suspension control and pitching suppressive suspension control with road-condition-dependent variable control characteristics, e.g. variable sensing ability of change of vehicle driving condition across HARD/SOFT criteria. Therefore, when the HARD mode is selected in the foregoing first embodiment set forth above the controller 100 actuates the shock absorber to MEDIUM mode.

It should be noted that if different damping forces in the piston expansion stroke and in the compression stroke are preferred, the cross-sectional diameters of the orifices 424a, 424b, 424c may differ from those of the orifices 426a, 426b, and 426c. Alternatively, if an even greater damping force in the expansion stroke in HARD mode is desired, the orifice 424a can be omitted to create a greater flow restriction in the piston expansion stroke.

Though the foregoing embodiment is directed to control the suspension characteristics by adjusting damping characteristics of the shock absorber, suspension characteristics can be controlled by other ways, for example by adjusting resiliency of the roll stabilizer or suspension spring. The followings are examples of the variable resilient characteristics roll stabilizer and the suspension spring.

Figure 13:
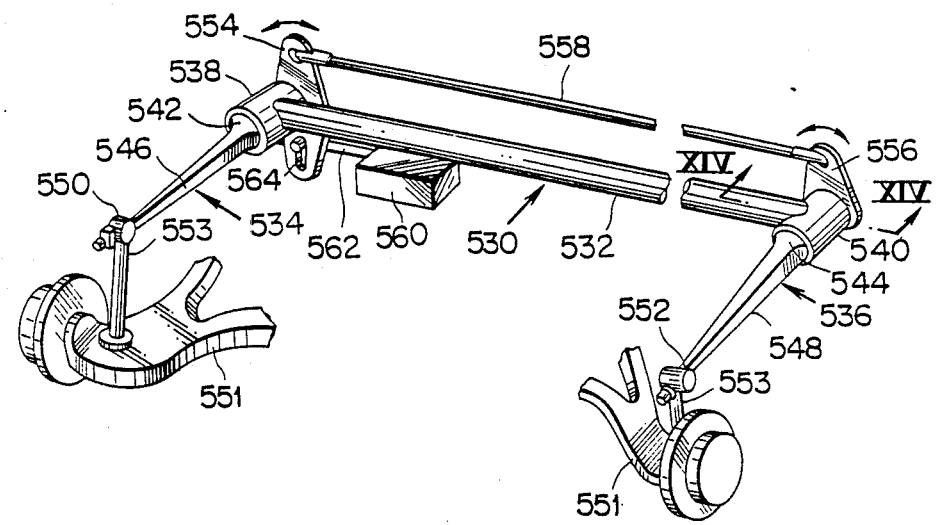
FIG. 13 is a perspective view Of a variable torsional force stabilizer employed in the preferred embodiment of the suspension control system of FIG. 2.
Figure 14:
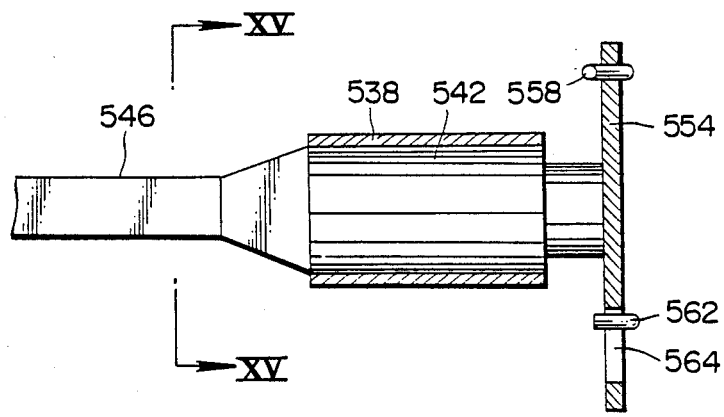
FIG. 14 is a section taken along line XIV-XIV of FIG. 13.
Figure 15:
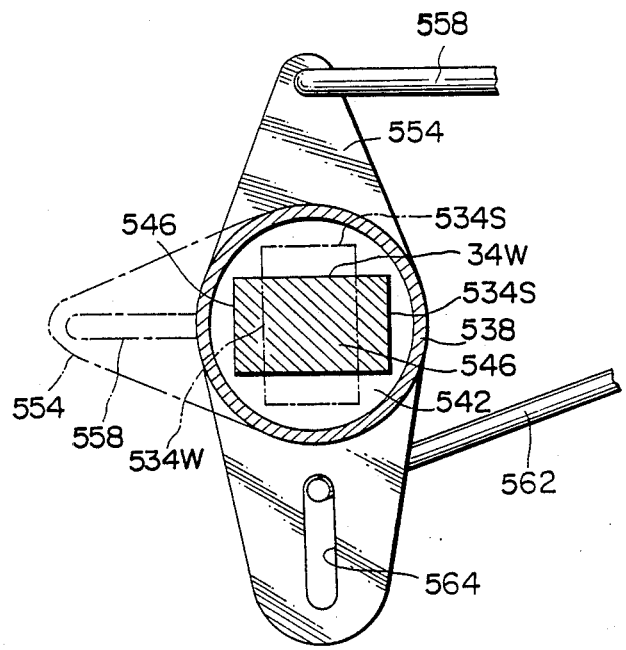
FIG. 15 is a section taken along the line XV—XV of FIG. 14.

FIGS. 13 to 15 show the structure of a roll stabilizer 530 to be controller by the first or second embodiment of the suspension control system as set forth above. The roll stabilizer 530 comprises a transverse bar section 532 and a pair of parallel bar sections 534 and 536. The transverse bar section 532 extends essentially perpendicular to the vehicle axis and has a circular cross-section. The transverse bar section 532 is connected to hollow cylindrical bearing sections 538 and 540 at both ends. The parallel bar sections 534 and 536 have end segments 542 and 544 of circular cross-section adapted to rotatably engage the bearings 538 and 540 of the transverse bar section 532. The parallel bar sections 534 and 536 also have rectangular cross-section major sections 546 and 548, each of which has one end 550 and 552 connected to a suspension arm 551 through a connecting rod 553 which allows free rotation of the associated bar 534 or 536.

The cylindrical cross-section end segments 542 and 544 of the parallel bar sections 534 and 536 extend beyond the ends of the bearing portion 538 and 540. Link plates 554 and 556 are rigidly fitted onto the protruding ends of the parallel bar sections 534 and 536. The link plates 534 and 536 are rotatable about the bearing sections 538 and 540 together with the parallel bar sections 534 and 536. The link plates are connected to each other through a linkage 558. In addition, the link plate 554 is associated with an actuator 560 through an actuation rod 562 engaging an elongated opening 564 of the link plate 554. The actuator 560 may comprise an electromagnetically operative solenoid. The actuator is adapted to be energized by a control signal fed from a controller 100 to rotate the link plate 554 along with the parallel bar section 534 through 90° from the shown neutral position. When the actuator 560 is energized, the link plate 556 is also rotated according to rotation of the link plate 554 to pivot the parallel bar 564 through 90° within the bearing section 540.

As shown in FIG. 15, at the neutral position, the parallel bar sections 534 and 536 lie with their wider sides 534w (536w) horizontal. In this position, since the resistance of the parallel bar sections 534 and 536 to the vertical bending moment applied when the vehicle wheel bounds or rebounds is relatively small, the torsion on the transverse bar section 532 of the stabilizer 530 is small. When the actuator 560 is energized, the parallel bar sections 534 and 536 are rotated to lie with their shorter sides 534s (536s) horizontal, as shown in phantom line in FIG. 12. In this position. the bending stress on the parallel bar sections 534 and 536 is increased, i.e., the torsion on the transverse bar section 532 of the stabilizer is increase.

In this embodiment. the roll-stabilizer is normally arranged so that the wider sides 534W and 536W of the parallel bar sections 534 and 536 lie horizontal. As set forth above, since the resistance of the parallel bar sections 534 and 536 to bounding and rebounding of the vehicle wheel is relatively weak in this position, the stiffness of the suspension remains low to provide good riding comfort. This roll-stabilizer 530 is held in this position as long as the road surface condition indicative signal value remains less than the threshold value which is also derived in accordance with the vehicle speed.

When the intensity of vehicular rolling due to steering operation or intensity of vehicular pitching due to acceleration and deceleration of the engine speed, exceeds the threshold value. the actuator 560 is energized to rotate the parallel bar sections 534 and 536 through 90° to align the shorter sides 534S and 536S horizontally. As a result, a greater resistance is exerted against bounding and rebounding of the vehicle wheel to successfully suppress rolling motion of the vehicle body.

Therefore, controlling the stiffness of the roll-stabilizer set forth above can also achieve roll-suppressive and/or pitching-suppressive suspension control comparable to that of the first embodiment.

Figure 16:
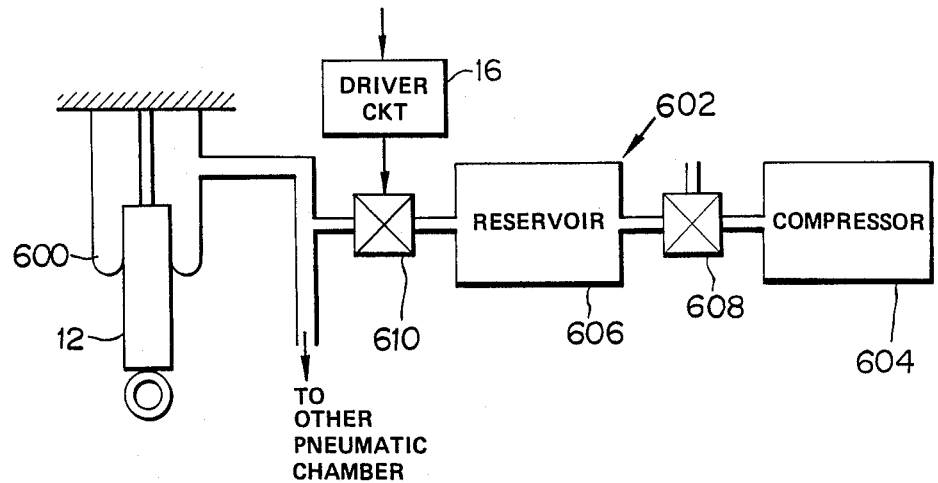
FIG. 16 is a schematic block diagram of a pneumatic suspension system which has an adjustable pneumatic spring for adjusting suspension characteristics, which pneumatic suspension system can be employed in the preferred embodiment of the suspension control system of FIG. 2.

FIG. 16 shows another arrangement of the automotive suspension system to which the control system according to the present invention is applicable. In the shown system, an expandable and contractable pneumatic chamber 600 is formed above the shock absorber 14. The pneumatic chamber 600 is connected to a pressurized pneumatic fluid source 602. The fluid source 602 comprises a compressor 604 for pressurizing a fluid such as air, a reservoir tank 606 connected to the compressor 604 through an induction valve 608, and a pressure control valve 610. The pressure control valve 610 connected to the driver circuit 16 to be controlled thereby. In the induction mode, the fluid reservoir 606 is connected to the compressor 604 to receive the pressurized fluid. On the other hand, the fluid reservoir 606 is open to atmosphere to decrease the fluid pressure in the ventilation mode of the induction valve.

The pressure control valve 610 is co-operative with the induction valve 608 to adjust the fluid pressure in the pneumatic chamber 600 in accordance with vehicle driving conditions.

According to the shown embodiment, the driver circuit 16 may be connected to the control system of any of the first embodiment so that it is activated in response to road roughness. When energized by the driver circuit, the pressure control valve 610 closes to block pneumatic fluid communication between the pneumatic chamber 600 and the fluid reservoir 606. As a result, the effective volume of the pneumatic chamber 600 corresponds to that of the pneumatic chamber. Since the damping characteristics due to the pneumatic pressure in the pneumatic chamber is related to the effective volume of the pneumatic chamber and a smaller volume is achieved by blocking fluid communication between the pneumatic chamber and the fluid reservoir, the pneumatic chamber becomes relatively rigid in this case, providing a larger damping force in response to the rough road which causes relatively low-frequency of vibration on the vehicle body as detected by the manner as set out with respect to the first embodiment.

On the other hand, in the normal valve position, the pressure control valve 610 opens to establish fluid communication between the pneumatic chamber and the fluid reservoir. As a result, the effective volume becomes equal to the sum of the volumes of the pneumatic chamber and the fluid reservoir. By providing a larger effective volume, damping characteristics of the pneumatic chamber are weakened.

The above-mentioned suspension system structure of FIG. 15 has been disclosed in U.S. Pat. No. 4,349,077 to Sekiguchi et al and U.S. Pat. No. 4,327,936 to Sekiguchi. In addition, a similar system has been disclosed in the co-pending U.S. patent application Ser. No. 573,504, filed on Jan. 24, 1984, which corresponds to the co-pending European Patent Application No. 84100729.7, filed on Jan. 24, 1984. The contents of the above-identified U.S. Patents and the co-pending applications are hereby incorporated by reference.

Roll-suppressive and/or pitch-suppressive suspension control with variable control characteristics related to road surface conditions as set forth above, can also be achieved with this suspension system. When the intensity of vehicular rolling or pitching calls for harder suspension, the pressure control valve 610 is closed to block fluid communication between the pneumatic chamber 600 and the reservoir in order to increase the stiffness of the strut assembly and so produce a greater damping force with which to suppress vibration of the vehicle body. On the other hand, under relatively smooth road surface conditions, the pressure control valve 610 remains open, allowing fluid communication between the pneumatic chamber and the reservoir chamber. As a result, sufficiently soft shock-absorbing characteristics can be provided to ensure good riding comfort.

As set forth above, according to the present invention, the vehicular suspension system can provide both riding comfort and good drivability by controlling the hardness of the suspension depending upon the road surface conditions. Furthermore, as set forth above, providing control characteristics that vary with the road surface condition reliably prevents unnecessary operation of the suspension system under the harder suspension characteristics due to mis-detection which may otherwise be caused by relatively strong kick-back from the road wheel due to the roughness of the road or by unnecessary or unexpected accelerator pedal operation due to relatively severe vehicular body vibrations.

Although the shown embodiments employ a kind of potentiometer for monitoring relative displacement between the vehicle body and the road wheel, any kind or type of sensor suitable for monitoring road surface roughness may be employed in the shown embodiments of the suspension control system.

What is claimed is:

1. An automotive suspension control system comprising:
   a suspension system suspending road wheels from a vehicle body and having suspension characteristics variable between a first harder suspension characteristics mode and a second softer suspension characteristics mode;
   an actuator selectively operating said suspension system in a selected one of said first harder suspension characteristics mode and said second softer suspension characteristics mode;
   a first sensor monitoring a preselected first suspension control parameter indicative of vehicle attitude and producing a first sensor signal, said suspension control parameter being selected from vehicular driving parameters causing vehicular attitude change;
   a second sensor monitoring the roughness of the road surface and producing a second sensor signal indicative of the road surface condition; and
   a controller deriving a control signal for operating said actuator to operate said suspension system in the selected one of said first harder suspension characteristics mode and said second softer suspension characteristics mode depending on said first sensor signal value and predetermined control characteristics which define a schedule of suspension characteristics mode selection in relation to said preselected suspension control parameter, said controller having a plurality of said predetermined control characteristics and selecting one of said control characteristics according to the value of said second sensor signal.

2. An automotive suspension control system as set forth in claim 1, wherein said controller compares said first sensor signal value with a given threshold value and produces a control signal ordering said actuator to operate said suspension system in said first harder suspension characteristics mode when said first sensor signal value is greater than said threshold value.

3. An automotive suspension control system as set forth in claim wherein said threshold value is variable between first and second threshold values depending upon said second sensor signal value.

4. An automotive suspension control system as set forth in claim 3, wherein said first threshold value is less than said second threshold value, and said controller selects said second threshold value when said second sensor signal value exceeds a predetermined reference value which represents a smooth/rough road condition criterion.

5. An automotive suspension control system as set forth in claim 4, wherein said first sensor monitors vehicle attitude leading to vehicular roll and produces a first sensor signal having a value representative of vehicular roll intensity.

6. An automotive suspension control system as set forth in claim 5, wherein said first sensor comprises a steering angle sensor producing a first sensor signal representative of steering column angular displacement.

7. A method as set forth in claim 5, wherein, in the step of monitoring the vehicle attitude, a steering angle displacment is monitored for producing a first signal representative of steering column angular displacement.

8. An automotive suspension control system as set forth in claim 4, wherein said first sensor monitors vehicle attitude leading to vehicular pitch and produces a first sensor signal having a value representative of vehicular pitch intensity.

9. An automotive suspension control system as set forth in claim 8 wherein said first sensor monitors a parameter influencing engine revolution speed and produce an engine speed indicative first sensor signal.

10. An automotive suspension control system as set forth in claim 9, wherein said first sensor monitors a fuel supply pulse having a pulse width representative of the load on the engine. and said controller detects engine acceleration and deceleration based on variations in said fuel supply pulse width.

11. A method as set forth in claim 4, wherein, in the step of monitoring vehicle attitude it is monitored the vehicular steering operation to detect the vehicle attitude leading to vehicular pitch and produces a first signal having a value representative of vehicular pitch intensity.

12. A method as set forth in claim 11, wherein said vehicle driving behaviour monitoring step is performed to monitor a parameter influencing engine revolution speed and produce an engine speed indicative first sensor signal.

13. A method as set forth in claim 12, wherein in the step of monitoring the vehicle attitude, a fuel supply pulse having a pulse width representative of the road on the engine is monitored for detecting engine acceleration and deceleration based on variations in said fuel supply pulse width.

14. An automotive suspension control system as set forth in claim 3, wherein said first sensor monitors fuel supply pulse having a pulse width representative of the load on the engine, and said controller detects engine acceleration and deceleration based on variations in said fuel supply pulse width and switches said threshold value from a normal value to an increased value when the intensity of engine acceleration and deceleration is greater than a predetermined vehicle pitch reference value.

15. An automotive suspension control system as set forth in claim 14, which further comprises means for detecting power transmission gear position and said controller adjusts said threshold value according to the transmission gear position.

16. An automotive suspension control system comprising:
   a suspension system suspending road wheels from a vehicle body and having suspension characteristics variable between a first harder suspension characteristics mode and a second softer suspension characteristics mode;
   an actuator selectively operating said suspension system in a selected one of said first harder suspension characteristics mode and said second softer suspension characteristics mode;
   a first sensor means for monitoring a vehicle driving operation leading to changes in vehicle attitude and producing a first sensor signal having a value representative of the magnitude of change in vehicle attitude;

a second sensor means for monitoring the roughness of the road surface and producing a second sensor signal indicative of the road surface condition; and a controller deriving a control signal ordering said actuator to operate said suspension system in the selected one of said first and second suspension characteristics modes depending on said first sensor signal value and predetermined control characteristics which defines a schedule of varying the suspension characteristics of said suspension system in relation to vehicle attitude change represented by said first sensor signal value, in such a manner that said suspension system normally operates in said second softer suspension characteristics mode and operates in said first harder suspension characteristics more in response to vehicle attitude changes exceeding a predetermined magnitude, said controller selecting one of a plurality of control characteristics according to the value of said second sensor signal.

17. An automotive suspension control system as set forth in claim 16, wherein said controller Compares said first sensor signal vale with a given threshold value and produces a control signal ordering said actuator to operate said suspension system in said first harder suspension characteristics mode when said first sensor signal value is greater than said threshold value.

18. An automotive suspension control system as set forth in claim 17, wherein said threshold value is variable between first and second threshold values depending upon said second sensor signal value.

19. An automotive suspension control system as set forth in claim 18, wherein said threshold value is variable between a first and a second threshold values, said first threshold value being less than said second threshold value, and said controller selects said second threshold value when said second sensor signal value exceeds a predetermined reference value which represents a smooth/rough road condition criterion.

20. An automotive suspension control system as set forth in claim 19, wherein said first sensor comprises a steering angle sensor producing a first sensor signal representative of steering column angular displacement.

21. An automotive suspension control system as set forth in claim 19, wherein said first sensor monitors vehicle attitude leading to vehicular pitch and produces a first sensor signal having a value representative of vehicular pitch intensity.

22. An automotive suspension control system as set forth in claim 21, wherein said first sensor monitors a parameter influencing engine revolution speed and produce an engine speed indicative first sensor signal.

23. An automotive suspension control system as set forth in claim 22, wherein said first sensor monitors a fuel supply pulse having a pulse width representative of the load on the engine, and said controller detects engine acceleration and deceleration based on variations in said fuel supply pulse width.

24. An automotive suspension control system as set forth in claim 21, wherein said first sensor monitors fuel supply pulse having a pulse width representative of the load on the engine, and said controller detects engine acceleration and deceleration based on variations in said fuel supply pulse width and switches said threshold value from a normal value to an increased value when the intensity of engine acceleration and deceleration is greater than a predetermined vehicle pitch reference value.

25. An automotive suspension control system as set forth in claim 24, which further comprises means for detecting power transmission gear position, and said controller adjusts said threshold value according to the transmission gear position.

26. An automotive suspension control system as set forth in claim 16, wherein said second sensor comprises a potentiometer monitoring relative displacement between the vehicle body and the road wheel and producing said second sensor signal indicative of the displacement between said vehicle body and said road wheel.

27. An automotive suspension control system as set forth in claim 16, wherein said second sensor comprises an ultra-sonic sensor mounted on the vehicle body which transmits ultra-sonic waves toward the road surface. receives the ultra-sonic waves reflected by the road surface and determines the distance to the road surface by measuring the elapsed time between transmission of the ultra-sonic waves and reception of the reflected ultra-sonic waves.

28. An automotive suspension control system as set forth in claim 16 wherein said suspension system includes a variable damping force shock absorber with variable damping characteristics capable of producing a greater damping force in said first harder suspension characteristics of said suspension system and a smaller damping force in said second softer suspension charactertistics of said suspension system.

29. In an automotive suspension control system including a suspension system suspending road wheels from a vehicle body and having suspension characteristics variable between a first harder suspension characteristics mode and a second softer suspension characteristics mode, and an actuator associated with said suspension system for operating said suspension system in a selected one of said first harder suspension characteristics mode and said second softer suspension characteristics mode, a method for controlling the suspension characteristics comprising the steps of:

monitoring a preselected first suspension control parameter indicative of vehicle attitude and producing a first signal;

monitoring roughness of the road surface and producing a second signal indicative of the road surface condition, and deriving a control signal for operating said actuator to operate said suspension system in the selected one of said first harder suspension characteristics mode and said second softer suspension characteristics mode depending on said first signal value and according to predetermined control characteristics which define criterion of said first sensor signal value for switching suspension characteristics of said suspension system between said first harder characteristics mode position and said second softer characteristics mode, said control characteristics being selected among a plurality of predetermined control characteristics according to the value of said second sensor signal.

30. A method as set forth in claim 29, wherein said derivation of said control signal includes a step of comprising said first signal value with a given threshold value and produces a control signal ordering said actuator to operate said suspension system in said first harder suspension characteristics mode when said first signal value is greater than said threshold value.

31. An method as set forth in claim 30, wherein said threshold value is variable between first and second threshold values depending upon said second signal value.

32. A method as set forth in claim 31, wherein said first threshold value is less than said second threshold value, and said controller selects said second threshold value when said second signal value exceeds a predetermined reference value which represents a smooth-/rough road condition criterion.

33. A method as set forth in claim 32, wherein, in said step of monitoring vehicle attitude is monitored a vehicle driving behaviour leading to vehicular roll and produces a first sensor signal having a value representative of vehicular roll intensity.

34. A method as set forth in claim 31, in the step of monitoring vehicle attitude fuel supply pulse having a pulse width representative of the load on the engine is monitored for detecting engine acceleration and deceleration based on variations in said fuel supply pulse width, and in the step of deriving said control signal, said threshold value is switched from a normal value to an increased value when the magnitude of engine acceleration and deceleration is greater than a predetermined vehicle pitch reference value.

35. A method as set forth in claim 34, which further comprises the step of detecting power transmission gear position, and said controller adjusts said threshold value according to the transmission gear position.

36. An anti-rolling automotive suspension control system comprising:
a suspension system suspending road wheels from a vehicle body and having suspension characteristics variable between a first harder suspension characteristics mode and a second softer suspension characteristics mode;
an actuator selectively operating said suspension system in a selected one of said first harder suspension characteristics mode and said second softer suspension characteristics mode;
a first sensor monitoring a vehicular rolling magnitude representing parameter and producing a first sensor signal indicative thereof;
a second sensor monitoring roughness of the road surface and producing a second sensor signal indicative of the road surface condition; and
a controller normally deriving a control signal for operating said actuator to operate said suspension system in said second softer suspension characteristics mode and responsive to said first sensor signal value greater than a threshold value representative of a harder suspension criterion for deriving said control signal to operate said suspension system in said first harder suspension characteristics mode, said controller varying said threshold value according to said second sensor signal value.

37. An anti-pitching automotive suspension control system comprising:
a suspension system suspending road wheels from a vehicle body and having suspension characteristics variable between a first harder suspension characteristics mode and a second softer suspension characteristics mode;
an actuator selectively operating said suspension system in a selected one of said first harder suspension characteristics mode and said second softer suspension characteristics mode;
a first sensor monitoring a vehicular pitching magnitude representing parameter and producing a first sensor signal indicative thereof;
a second sensor monitoring roughness of the road surface and producing a second sensor signal indicative of the road surface condition; and
a controller normally deriving a control signal for operating said actuator to operate said suspension system in said second softer suspension characteristics mode and responsive to said first sensor signal value being greater than a threshold value representative of a harder suspension criterion for deriving said control signal to operate said suspension system in said first harder suspension characteristics mode, said controller varying said threshold value according to said second sensor signal value.

38. An anti-bouncing automotive suspension control system comprising:
a suspension system suspending road wheels from a vehicle body and having suspension characteristics variable between a first harder suspension characteristics mode and a second softer suspension characteristics mode;
an actuator selectively operating said suspension system in a selected one of said first harder suspension characteristics mode position and said second softer suspension characteristics mode position;
a first sensor monitoring a vehicular bouncing magnitude representing parameter and producing a first sensor signal indicative thereof;
a second sensor monitoring roughness of the road surface and producing a second sensor signal indicative of the road surface condition; and
a controller normally deriving a control signal for operating said actuator to operate said suspension system in said second softer suspension characteristics mode and responsive to said first sensor signal value being greater than a threshold value representative of a harder suspension criterion for deriving said control signal to operate said suspension system in said first harder suspension characteristics mode, said controller varying said threshold value according to said second sensor signal value.

* * * * *